United States Patent
Iwao

(10) Patent No.: US 12,415,133 B2
(45) Date of Patent: *Sep. 16, 2025

(54) STORAGE MEDIUM STORING GAME PROGRAM, GAME SYSTEM, GAME APPARATUS, AND GAME PROCESSING METHOD

(71) Applicants: Nintendo Co., Ltd., Kyoto (JP); The Pokemon Company, Tokyo (JP)

(72) Inventor: Kazumasa Iwao, Tokyo (JP)

(73) Assignees: Nintendo Co., Ltd., Kyoto (JP); The Pokémon Company, Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 17/949,666

(22) Filed: Sep. 21, 2022

(65) Prior Publication Data
US 2023/0191255 A1      Jun. 22, 2023

(30) Foreign Application Priority Data
Dec. 22, 2021  (JP) .................................. 2021-208275

(51) Int. Cl.
*A63F 13/57* (2014.01)
*A63F 13/52* (2014.01)
(Continued)

(52) U.S. Cl.
CPC ............ *A63F 13/577* (2014.09); *A63F 13/52* (2014.09); *A63F 13/56* (2014.09)

(58) Field of Classification Search
CPC ........ A63F 13/20; A63F 13/21; A63F 13/219; A63F 13/22; A63F 13/23; A63F 13/25; A63F 13/426; A63F 13/44; A63F 13/45; A63F 13/50; A63F 13/52; A63F 13/525; A63F 13/5252; A63F 13/53;
(Continued)

(56) References Cited

U.S. PATENT DOCUMENTS

| | | | |
|---|---|---|---|
| 2012/0157201 A1* | 6/2012 | Mizutani | A63F 13/213 463/31 |
| 2020/0114253 A1 | 4/2020 | Maruyama | |
| 2022/0080313 A1 | 3/2022 | Wu | |

FOREIGN PATENT DOCUMENTS

| | | |
|---|---|---|
| CN | 112044071 | 12/2020 |
| JP | 2011-024613 | 2/2011 |

(Continued)

OTHER PUBLICATIONS

"Catching Wild Pokémon", The Pokemon Company, Available Online At: https://www.pokemon.com/us/strategy/pokemon-rpgs-101/, Retrieved from Online on Dec. 8, 2021, 15 pages.

(Continued)

*Primary Examiner* — Omkar A Deodhar
(74) *Attorney, Agent, or Firm* — Nixon & Vanderhye PC

(57) ABSTRACT

In a first mode, an aiming direction in a virtual space is determined based on a second operation input, and a player character is caused to launch, in the aiming direction, an item that affects a field character disposed on a field in the virtual space, based on a third operation input. In a second mode, the aiming direction is determined, based on the second operation input, and the player character is caused to launch, in the aiming direction, a fighting character that fights, based on the third operation input.

38 Claims, 26 Drawing Sheets

(51) Int. Cl.
*A63F 13/56* (2014.01)
*A63F 13/577* (2014.01)

(58) Field of Classification Search
CPC ........ A63F 13/537; A63F 13/55; A63F 13/56;
A63F 13/58; A63F 13/69; A63F 13/70;
A63F 13/812
See application file for complete search history.

(56) References Cited

FOREIGN PATENT DOCUMENTS

| | | |
|---|---|---|
| JP | 2014-045888 | 3/2014 |
| JP | 2020-039403 | 3/2020 |
| JP | 2020-058659 | 4/2020 |
| KR | 10-2019-0131559 | 11/2019 |

OTHER PUBLICATIONS

HRK unconscious game record, Giant beast that manipulates freezing! Defeat the Ice Titan! ARK [Extinction] Episode 20, YouTube [online] [video], Dec. 12, 2020, <https://www.you tube.com/watch?v=KjOVKPqSByA>, see video time [02:23]-[05:32] [Search date: Aug. 15, 2023] pp. 1-6.
[ARK] A list of tools available for taming (PC version), Dolls dream in 4.5 tatami mats [online], [Apr. 8, 2020], <https://stelladia.club/game/ark/tame-tool/>, see the column "Tools that can be used to make a coma" [Search date: Aug. 16, 2023] pp. 1-20.
[MHW] How and the way to capture monsters, It is a basic way to capture large monster with the anesthetic ball using a trap, without forgetting to weaken it, Arutora, Jan. 30, 2018, [Search date: Aug. 16, 2023] <https://arutora.com/14874#5>, see the text and figures; pp. 1-5.
CAPCOM, Lower screen operation during quest, Monster Hunter 4 | Official Web manual, stored on May 12, 2014, [Search date: Aug. 16, 2023] <https://web.archive.org/web/20140512070052/http://game.capcom.com:80/manual/MH4/ja/page-26.html>, see the column "Target Camera" (possibly as early as May 12, 2014.) pp. 1-3.
[Pokemon Go] Tips on how to catch! Commentary regarding the capture rate-, Game with, Oct. 11, 2019, [Search date: Aug. 17, 2023] <https://pokemongo.gamewith.jp/article/show/26440 >, see the column "Relationship between capture rate and circles" pp. 1-8.
Samiad, [MHP3] Reached 100 Nargacuga hunted, Was it burned well?, Aug. 8, 2011, [Search date: Aug. 8, 2023] <samiadoraven.blog31.fc2.com/blog-entry-768.html>, see the text and figures; pp. 1-6.
[ARK Mobile] Two secrets that castroides (Beaver) must be tamed!, ARK Strategy wiki, Dec. 28, 2018, [Search date: Aug. 16, 2023] <https://700kugame.com/ark/%E3%80%90ARK%E3%83%A2%E3%83%90%E3%82%A4%E3%83%AB%E3%80%91%E3%82%AB%E3%82%B9%E3%83%88%E3%83%AD%E3%82%A4%E3%83%87%E3%82%B9>, see the column "Method of operating Castroides" pp. 1-7.
CAPCOM, Item collecting / stripping-off , Monster Hunter 4 Official Web manual, stored on Oct. 16, 2014, [Search date: Aug. 16, 2023] <https://web.archive.org/web/20141016031929/http://game.capcom.com:80/manual/MH4/ja/page-49.html>, see the text and figures (possibly as early as Oct. 16, 2014.) pp. 1-3.
[KanColle] Explanation on transport gauge | Kantai Collection (KanColle) Strategy wiki, Game Ranbu, stored on Jun. 26, 2019, [Search date: Aug. 16, 2023] <https://web.archive.org/web/20190626023829/https://gameranbu.jp/kancolle/d645dca6a06bc701f7ea>, see the column "The method of reducing a transportation gauge" (possibly as early as Jun. 26, 2019) pp. 1-5.
Office Action issued in Japanese Patent Application No. 2021-208275 on Aug. 23, 2023, pp. 1-8 [machine translation included].
[Pokemon Go] Summary of the probability of Capture, GameWith [online], May 19, 2021, URL:https:pokemongo.camewith.ip/article/show/61741,8 pages.

Notice of Allowance issued on May 17, 2024 for Japanese Patent Application No. 2024-026645 (with translation), 8 pages.
Youtube, Path of Exile: Bestiary Basics—Crafting & Capturing Guide, electronically retrieved May 14, 2025, 1 page. https://www.youtube.com/watch?v=4WNXhFEXrYA.
X, Pokemon, electronically retrieved May 14, 2025, 1 page. https://x.com/pokemon.
Youtube, DQB2, electronically retrieved May 14, 2025, 1 page. https://www.youtube.com/watch?v=FUD6OU5crDo.
Steam, Dark Souls III, electronically retrieved May 14, 2025, 1 page. https://store.steampowered.com/app/374320/DARK/SOULS_III _?1=japanese.
Nexusmods, Pocket Souls, "Welcome to the World of Pocket Souls!", electronically retrieved May 14, 2025, 1 page. https://www.nexusmods.com/darksouls3/mods/690.
Waybackmachine, Dark Souls III, electronically retrieved May 14, 2025, 1 page. https://web.archive.org/web/20180721090718/https:/www.fromsoftware.jp/manual/darksouls3/win/operation.html.
Waybackmachine, Pokemon Go—"Mysterious Official Help: What is the Relationship between the 'Color and Size of the Circle' when Capturing and 'Ease of Catching'?", Jul. 25, 2016, 1 page. https://web.archive.org/web/20160727055710/https://appllio.com/pokemon-go-colored-target-ring-size-pkg.
Youtube, Nexomon Extinction, electronically retrieved May 14, 2025, 1 page. https://www.youtube.com/watch?v=vpwQ5sX9IBs.
Waybackmachine, Monster Hunter Cross MHX Strategy, electronically retrieved May 14, 2025, 1 page. https://web.archive.org/web/20151121222753/https://wiki.mhxg.org/data/1953.html.
Steam, Fallout 4, "About this Game", electronically retrieved May 14, 2025, 1 page. https://store.steampowered.com/app/377160/Fallout_4/?1=japanese.
Nexusmods, NukaMon Capture Ball—Files, electronically retrieved May 14, 2025, 1 page. https://www.nexusmods.com/fallout4/mods/15979?tab=files.
Game8, Pokemon Sword and Shield—"Tips for capturing and recommended Pokemon [Sword and Shield]", Jun. 23, 2021, 1 page. https://game8.jp/pokemon-sword-shield/306941.
Nexusmods, NukaMon Capture Ball—Posts, electronically retrieved May 14, 2025, 1 page. https://www.nexusmods.com/fallout4/mods/15979?tab=posts&BH=3.
Youtube, Craftpia, electronically retrieved May 14, 2025, 1 page. https://www.youtube.com/watch?v=15NU1BxodU8.
ARK, List of tools that can be used for taming (PC version), Apr. 18, 2020, 1 page. https://stelladia.club/game/ark/tame-tool/.
Youtube, Titanfall2, electronically retrieved May 14, 2025, 1 page. https://www.youtube.com/watch?v=4SmALKT1sGY.
Waybackmachine, Titanfall 2 Strategy Wiki, Munitions, electronically retrieved May 14, 2025, 1 page. https://web.archive.org/web/20170429220112/https://titanfall2.swiki.jp/index.php?%E8%BB%8D%E9%9C%80%E5%93%81.
Waybackmachine, Titanfall 2 Strategy Wiki, Setting, electronically retrieved May 14, 2025, 1 page. https://web.archive.org/web/20201126095640/https://titanfall2.swiki.jp/index.php?%E8%A8%AD%E5%AE%9A.
Youtube, Pikmin 3 Deluxe, electronically retrieved May 14, 2025, 1 page. https://www.youtube.com/watch?v=Tn7V90JprA4.
Waybackmachine, Pikmin 3 Strategy Guide | Deluxe Edition, List of operations and how to change button settings, electronically retrieved May 14, 2025, 1 page. https://web.archive.org/web/20210128235752/https://altema.jp/pikumin3/sousaitiran.
Game8, Pikmin 3 Deluxe Strategy Guide, [Pikmin 3] Characteristics and Locations of Winged Pikmin [Deluxe], Jun. 23, 2021, 1 page. https://game8.jp/pikmin3deluxe/354462.
4gamer.net, "Far Cry 5" play report. Set against the backdrop of a rural American countryside rich in nature, you fight back against the violence of a cruel and ruthless cult with violence, electronically retrieved May 14, 2025, 1 page. https://www.4gamer.net/games/380/G038063/20180404060/.
Steam, Far Cry 5, electronically retrieved May 14, 2025, 1 page. https://steamcommunity.com/sharedfiles/filedetails/?id=1352899558.
Waybackmachine, Steam, Far Cry 5, electronically retrieved May 14, 2025, 1 page. https://web.archive.org/web/20201112010752/https://steamcommunity.com/sharedfiles/filedetails/?id=1352899558.

(56) References Cited

OTHER PUBLICATIONS

Youtube, Tomb Raider, electronically retrieved May 14, 2025, 1 page. https://www.youtube.com/watch?v=eFtfC53YALY.
Youtube, Shadow of the Tomb Raider, electronically retrieved May 14, 2025, 1 page. https://www.youtube.com/watch?v=gkhCLttzkP8.
Youtube, #45 Rise of the Tomb Raider, electronically retrieved May 14, 2025, 1 page. https://www.youtube.com/watch?v=CemjzYpt8gs.
Youtube, Dark Souls III MOD, electronically retrieved May 14, 2025, 1 page. https://www.youtube.com/watch?v=2869QLEPsFo&t=877s.
Youtube, Octopath Traveler, electronically retrieved May 14, 2025, 1 page. https://www.youtube.com/watch?v=H_DQTafmbM4.
Youtube, [Monster Super League] A must-see for monster lovers! Capture, train, and battle! Introducing the newest release, electronically retrieved May 14, 2025, 1 page. https://www.youtube.com/watch?v=yCjdA1gMIrU.
Youtube, [FF14] Side Quest: Black Shroud: Marsette's Investigation Request #191, electronically retrieved May 14, 2025, 1 page. https://www.youtube.com/watch?v=FxL49EgrvRk.
Waybackmachine, Final Fantasy, Beginner's guide to fighting! How to attack a targeted enemy in FF14, electronically retrieved May 14, 2025, 1 page. https://web.archive.org/web/20201125061237/http://www.finalfantasyxiv.com/beginner/column/page04.html.
Pokeball capture rates and types, Dec. 13, 2019, electronically retrieved May 14, 2025, 1 page. http://blog.game-de.com/pm-bw2/monster-ball/.
Pokémon HeartGold SoulSilver Strategy Wiki, electronically retrieved May 14, 2025, 1 page. https://w.atwiki.jp/hgss/pages/51.html.
Youtube, Minecraft MOD, electronically retrieved May 14, 2025, 1 page. https://www.youtube.com/watch?v=Wrw7HzyVd0s.
Intel, What you need to run the mod on your PC, electronically retrieved May 14, 2025, 1 page. https://www.intel.co.jp/content/www/jp/ja/gaming/resources/mods.html.
Qureo, How to play Minecraft? How to install MODs explained, Dec. 18, 2024, 1 page. https://qureo.jp/class/blog/blog-27819.
Avtomaton, "Pixelmon Mod" that introduced "Pokemon" to "Minecraft" has been taken offline, but due to its worldwide popularity, mods are being mass-produced. Jul. 14, 2017, 1 page. https://automaton-media.com/articles/newsjp/20170714-50797/.
Waybackmachine, Nishi's Minecraft Strategy, Summary of PC version Minecraft operation methods and tips! There are many convenient key operations. Nov. 11, 2019, 1 page. https://web.archive.org/web/20191206232059/https://n5v.net/pc-technique/.
Waybackmachine, Pixelmonmod, Controls, electronically retrieved May 14, 2025, 1 page. https://web.archive.org/web/20201112022201/https://pixelmonmod.com/wiki/Controls.
Waybackmachine, Digminecraft, How to Use a Bow in Minecraft, electronically retrieved May 14, 2025, 1 page. https://web.archive.org/web/20150517024819/https://www.digminecraft.com/getting_started/how_to_use_bow.php.
Pixelmon Wiki, Monster Ball, electronically retrieved May 14, 2025, 1 page. https://pixelmon.rwiki.jp/%E3%82%A2%E3%82%A4%E3%83%86%E3%83%A0/%E3%83%A2%E3%83%B3%E3%82%B9%E3%82%BF%E3%83%BC%E3%83%9C%E3%83%BC%E3%83%AB.

* cited by examiner

F I G. 10
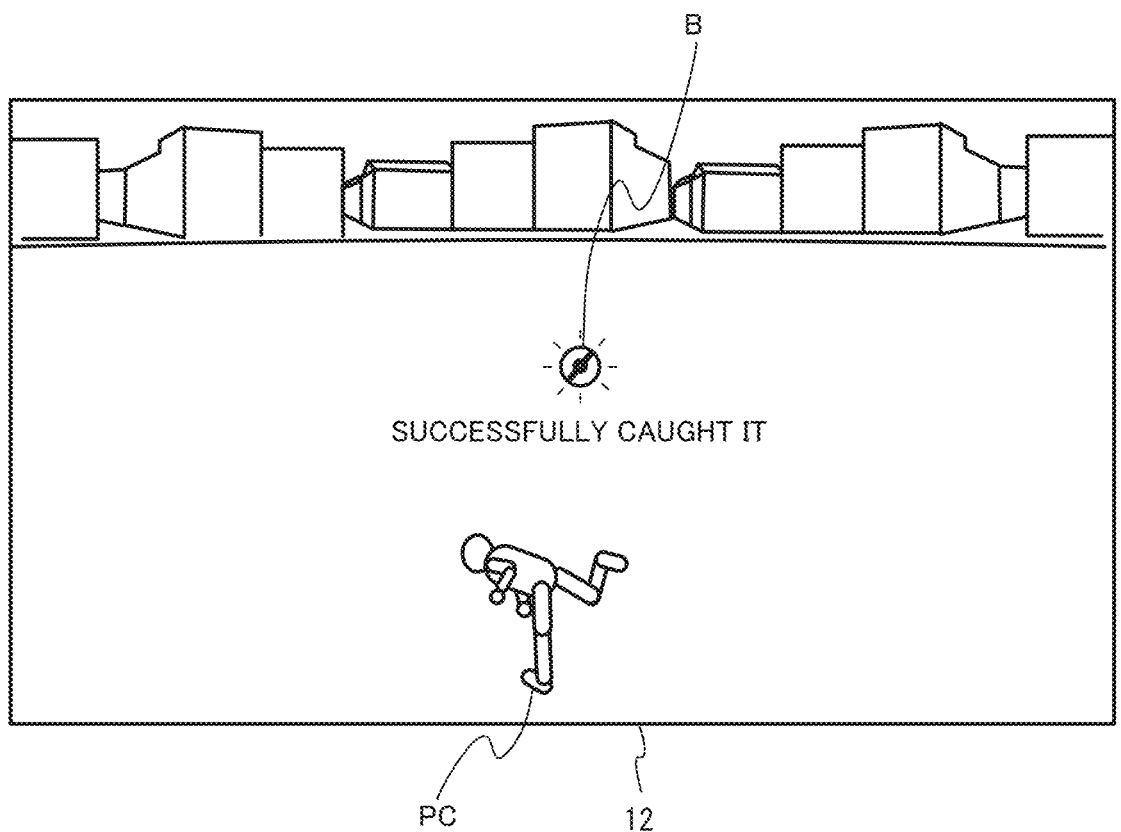

STORAGE MEDIUM STORING GAME PROGRAM, GAME SYSTEM, GAME APPARATUS, AND GAME PROCESSING METHOD

CROSS-REFERENCE TO RELATED APPLICATION

This application claims priority to Japanese Patent Application No. 2021-208275, filed on Dec. 22, 2021, the entire contents of which are incorporated herein by reference.

FIELD

The technology disclosed herein relates to game program-storing media, game systems, game apparatuses, and game processing methods that execute a process on a character in a virtual space.

BACKGROUND AND SUMMARY

There has conventionally been a game program that allows a player character to catch a character in a virtual space and possess the character.

However, the above game program allows a player character to catch a character only during a fight, and does not allow a player character to catch a character on a field.

With the above in mind, it is an object of the present non-limiting example to provide a game program-storing medium, game system, game apparatus, and game processing method that are capable of allowing a player character to perform a variety of actions on a field in a virtual space.

To achieve the object, the present non-limiting example may have the following features, for example.

A non-limiting example of a non-transitory computer-readable storage medium having stored therein a game program of the present non-limiting example is executed by a computer of an information processing apparatus. The game program causes the computer to perform operations comprising: switching between at least a first and a second mode, based on a first operation input; and in the first mode, determining an aiming direction in a virtual space, based on a second operation input, and causing a player character to launch, in the aiming direction, an item that affects a field character disposed on a field in the virtual space, based on a third operation input, and when the item is launched at a place where the field character is disposed, giving an effect associated with the item to the field character, and in the second mode, determining the aiming direction, based on the second operation input, and causing the player character to launch, in the aiming direction, a fighting character that fights, based on the third operation input, and when the fighting character is launched at a place where the field character is disposed, causing the field character and the fighting character to start fighting against each other on the field.

Thus, by switching between the first mode and the second mode, the player character can be caused to perform different actions, i.e., an action of launching, at a field character as a target on a field, an item that affects the field character, and an action of launching a fighting character that fights against a field character on a field, according to an operation input for causing the player character to perform a launching action in the direction indicated by an aiming point.

The item may include at least a catching item for catching the field character. The game program may further cause the computer to perform operations comprising: when the catching item launched in the first mode hits the field character, performing successful-catch determination relating to whether or not the catching is successful; and when the result of the successful-catch determination is positive, setting the field character hit by the catching item in a player's possession.

Thus, the user can choose whether to catch a field character or cause a fighting character to fight against a field character.

The item may further include an item having the effect of causing the result of the successful-catch determination to be more likely to be positive.

Thus, before a catching item is launched, successful-catch determination involved with the use of the catching item can be made more likely to be positive.

The item may further include an item having the effect of setting a limitation on a movement of the field character on the field.

Thus, by setting a limitation on a movement of a field character as a target on a field, a catching item is more likely to hit the field character.

The game program may further cause the computer to perform operations comprising: aligning the aiming direction with the field character, based on a fourth operation input.

Thus, the aiming direction can be easily aligned with a field character as a target on a field.

The game program may further cause the computer to perform operations comprising: displaying an indicator indicating how likely the result of the successful-catch determination is to be positive for a field character with which the aiming direction is aligned, based on the fourth operation input.

Thus, the indicator can be used in determination of whether or not to perform catching using a catching item. While the aiming direction is aligned with a field character, the indicator is displayed. Therefore, a catching item can be launched after the determination has been done.

The game program may further cause the computer to perform operations comprising: displaying information about a field character with which the aiming direction is aligned, based on the fourth operation input and a fifth operation input.

Thus, information about a field character as a target on a field can be easily viewed.

The information about the field character may include mission information about a history of an in-game mission including at least the number of the caught field characters and the number of times of a fight against the field character.

Thus, the history of missions is displayed for a field character as a target on a field, and can be used in determination of whether to choose the catch or the fight.

The game program may further cause the computer to perform operations comprising: causing the fighting character and the field character to fight against each other on the field, based on an operation input including at least an instruction to attack by the fighting character and an instruction to use an item, after start of the fight; when an instruction to use the catching item is issued during the fight, performing successful-catch determination of whether or not the field character is successfully caught using the catching item, based on a state of the field character that is changed due to the fight; and when the result of the successful-catch determination is positive during the fight, setting the field character in a player's possession.

Thus, it is possible to choose whether to catch a field character during a period of time other than a fight using a fighting character or catch a field character during the fight.

The game program may further cause the computer to perform operations comprising: in the fight, displaying an indicator indicating a state of the field character related to at least physical strength, at a location that is set, corresponding to a location of the field character, and controlling an orientation of a virtual camera, based on a sixth operation input.

Thus, even when an indicator indicating the physical strength of a field character is not displayed, the orientation of a virtual camera can be changed by an operation input. Therefore, the indicator can be displayed when desired by the user.

The game program may further cause the computer to perform operations comprising: in the second mode, when the fighting character is launched at a place where a collection object indicating that an item is allowed to be obtained is disposed on the field, causing the fighting character to perform an action with respect to the collection object, and setting the item associated with the collection object in a player's possession.

Thus, a fighting character can be used in other situations in addition to a fight against a field character.

The game program may further cause the computer to perform operations comprising: displaying a mark indicating the aiming direction in a display form that differs between the first mode and the second mode.

Thus, what is to be thrown by the player character can be easily recognized even while aligning the aiming point with a field character.

The item may be an event item that causes progression of an in-game event by hitting the field character. The game program may further cause the computer to perform operations comprising: in the in-game event, when a plurality of the event items have hit the field character until a clear condition is satisfied, determining that the in-game event is cleared, and when the fight against the field character is won, causing the clear condition to be easier to satisfy.

Thus, by switching between the first mode in which an item that affects a field character is launched and the second mode in which a fighting character that fights against a field character on a field is launched, various strategic aspects for clearing an in-game event can be provided.

The game program may further cause the computer to perform operations comprising: when the fight against the field character is won, setting a limitation on a movement of the field character in the virtual space during at least a period of time.

Thus, when a fighting character wins a fight against a field character, an item is more likely to hit the field character. Therefore, an in-game event can be advantageously cleared by the fight instead of launching of an item.

The clear condition may be that an event parameter that is reduced each time the event item hits the field character is lower than or equal to a reference. The game program may further cause the computer to perform operations comprising: when the fight against the field character is won, relatively increasing a reduction amount of the event parameter corresponding to hitting by the event item during at least a period of time.

Thus, the effect of an item launched in an in-game event can be increased.

Therefore, an in-game event can be more advantageously cleared by the fight instead of launching of an item.

The present non-limiting example may be implemented in the form of a game apparatus, game system, and game processing method.

According to the present non-limiting example, by switching between the first mode and the second mode, the player character can be caused to perform different actions, i.e., an action of launching, at a field character as a target on a field, an item that affects the field character, and an action of launching a fighting character that fights against a field character on a field, according to an operation input for causing the player character to perform a launching action in the direction indicated by an aiming point.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 10 is a diagram illustrating a non-limiting example of a game image in a third stage of catching of a field character FC.

DETAILED DESCRIPTION OF NON-LIMITING EXAMPLE EMBODIMENTS

A game system according to the present non-limiting example will now be described. A non-limiting example of a game system 1 according to the present non-limiting example includes a main body apparatus (information processing apparatus serving as the main body of a game apparatus in the present non-limiting example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the description that follows, a hardware configuration of the game system 1 of the present non-limiting example is described, and thereafter, the control of the game system 1 of the present non-limiting example is described.

Figure 1:
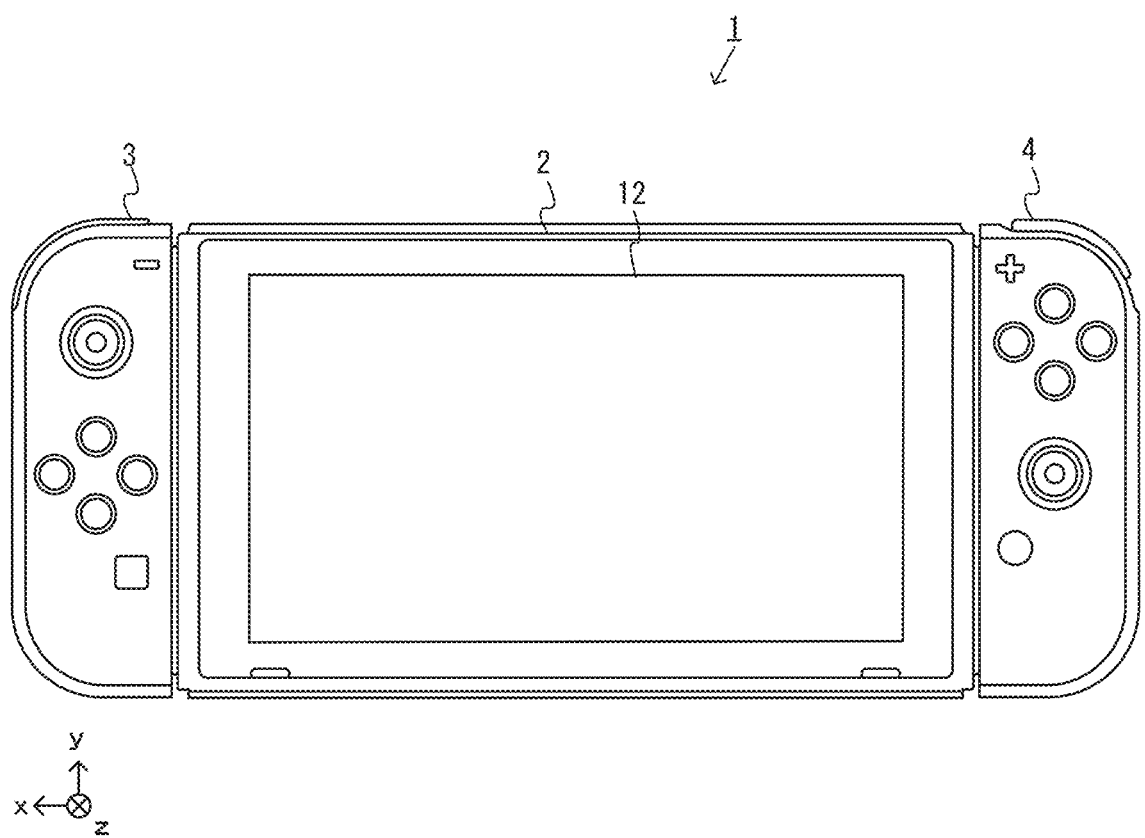
FIG. 1 is a diagram illustrating a non-limiting example of a state where a left controller 3 and a right controller 4 are attached to a main body apparatus 2.

FIG. 1 is a diagram illustrating a non-limiting example of the state where the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
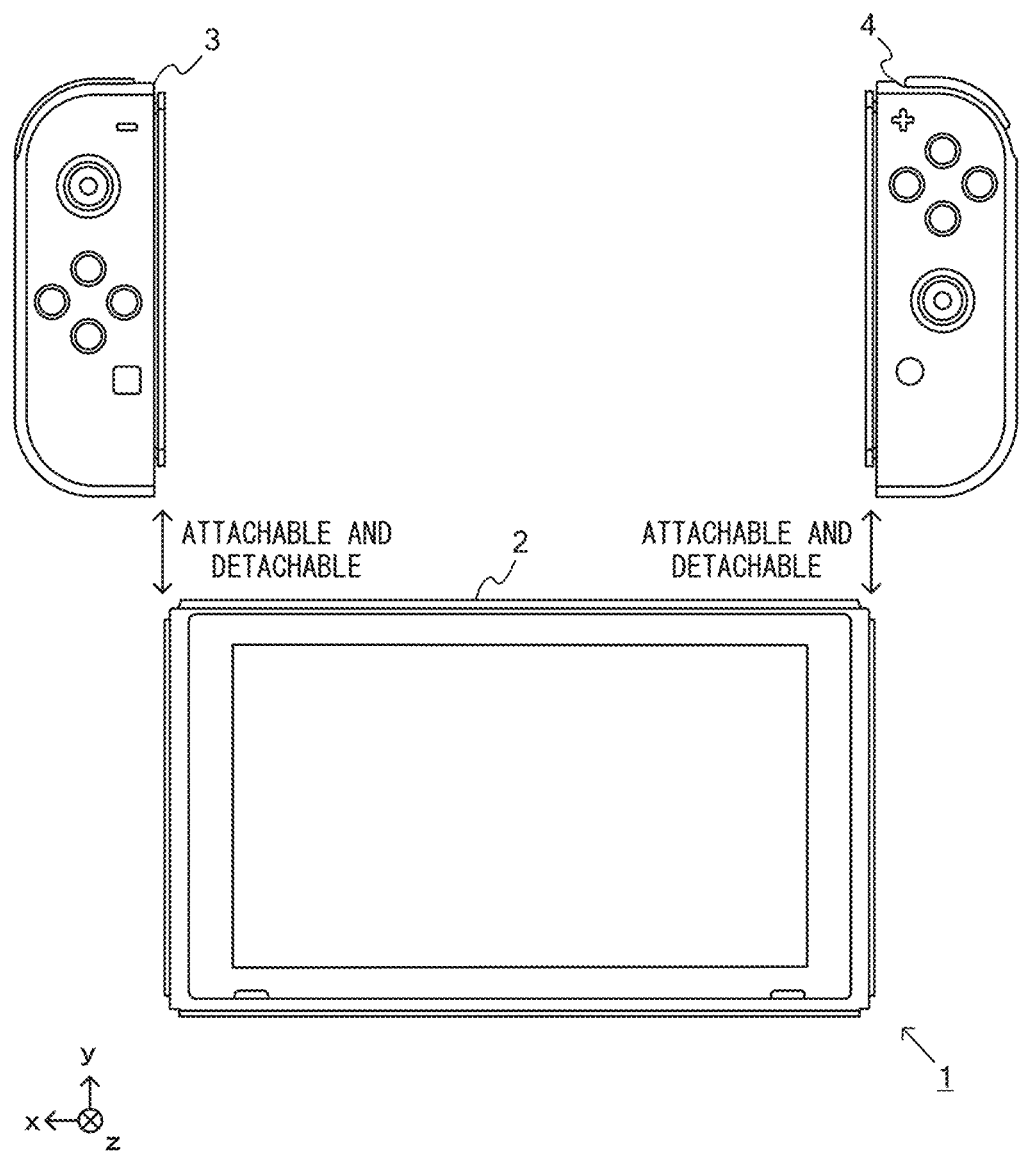
FIG. 2 is a diagram illustrating a non-limiting example of a state where a left controller 3 and a right controller 4 are detached from a main body apparatus 2.

FIG. 2 is a diagram illustrating a non-limiting example of the state where each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller."

Figure 3:
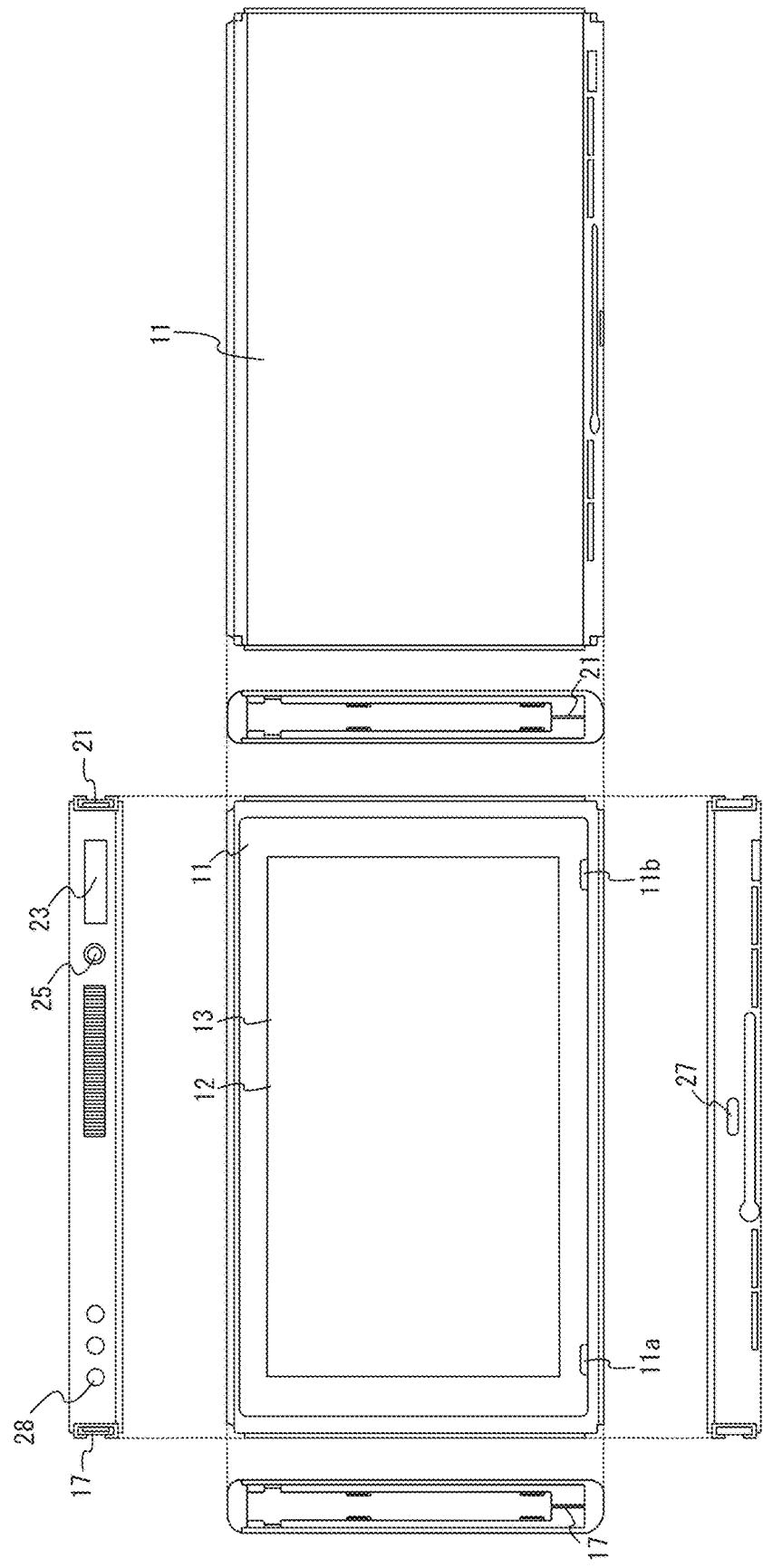
FIG. 3 illustrates six orthogonal views of a non-limiting example of a main body apparatus 2.

FIG. 3 illustrates six orthogonal views of a non-limiting example of the main body apparatus 2. As illustrated in FIG. 3, the main body apparatus 2 includes an approximately plate-shaped housing 11. In the present non-limiting example, a main surface (in other words, a surface on a front side, i.e., a surface on which the display 12 is provided) of the housing 11 has a generally rectangular shape.

It should be noted that the shape and the size of the housing 11 are optional. As a non-limiting example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present non-limiting example, the display 12 is a liquid crystal display device (LCD). The display 12, however, may be a display device of any suitable type.

In addition, the main body apparatus 2 includes a touch panel 13 on the screen of the display 12. In the present non-limiting example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11a and 11b are formed in the main surface of the housing 11. The speaker 88 outputs sounds through the speaker holes 11a and 11b.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present non-limiting example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present non-limiting example, the cradle has the function of charging the unified apparatus or the main body apparatus 2 alone, being placed thereon. The cradle also functions as a hub device (specifically, a USB hub).

Figure 4:
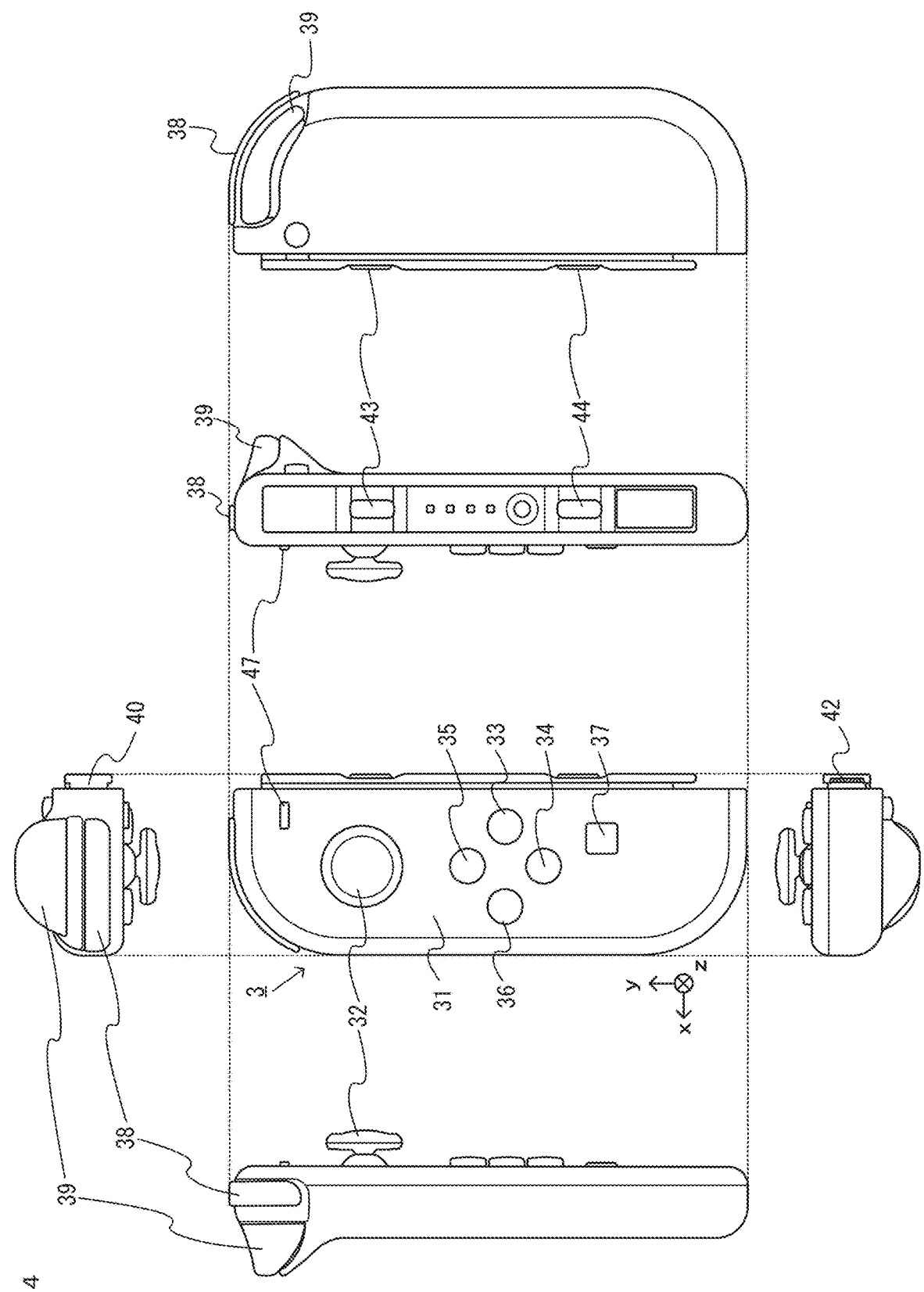
FIG. 4 illustrates six orthogonal views of a non-limiting example of a left controller 3.

FIG. 4 illustrates six orthogonal views of a non-limiting example of the left controller 3. As illustrated in FIG. 4, the left controller 3 includes a housing 31. In the present non-limiting example, the housing 31 has a vertically long shape, e.g., is shaped to be long in an up-down direction (i.e., a y-axis direction illustrated in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present non-limiting example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 5:
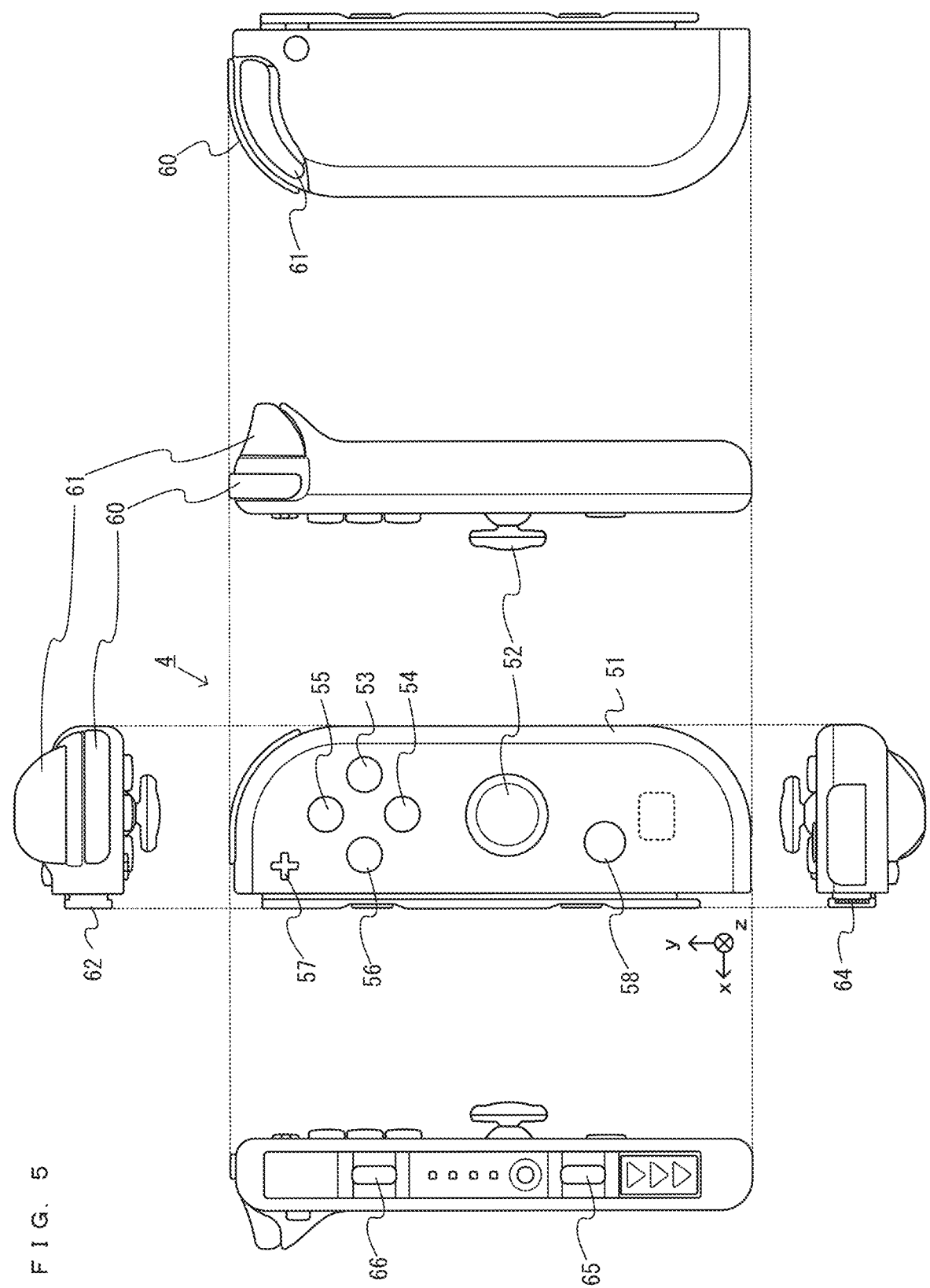
FIG. 5 illustrates six orthogonal views of a non-limiting example of a right controller 4.

FIG. 5 illustrates six orthogonal views of a non-limiting example of the right controller 4. As illustrated in FIG. 5, the right controller 4 includes a housing 51. In the present non-limiting example, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present non-limiting example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
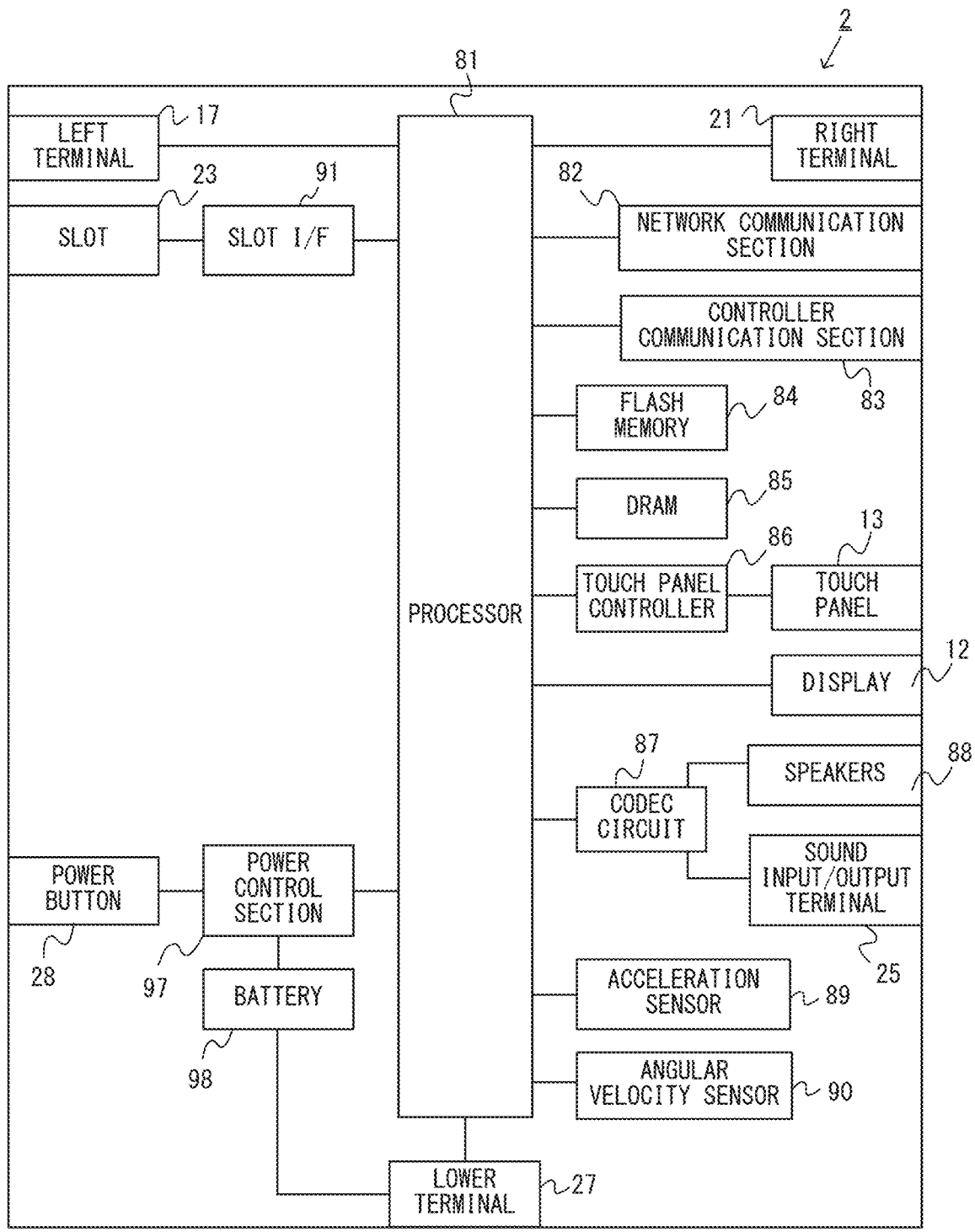
FIG. 6 is a block diagram illustrating a non-limiting example of an internal configuration of a main body apparatus 2.

FIG. 6 is a block diagram illustrating a non-limiting example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present non-limiting example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication," in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present non-limiting example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present non-limiting example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As a non-limiting example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

Further, the main body apparatus 2 includes an acceleration sensor 89. In the present non-limiting example, the acceleration sensor 89 detects the magnitudes of accelerations along predetermined three axial (e.g., the x-, y-, and z-axes shown in FIG. 1) directions. It should be noted that the acceleration sensor 89 may detect an acceleration along one axial direction or accelerations along two axial directions.

Further, the main body apparatus 2 includes an angular velocity sensor 90. In the present non-limiting example, the angular velocity sensor 90 detects angular velocities about predetermined three axes (e.g., the x-, y-, and z-axes shown in FIG. 1). It should be noted that the angular velocity sensor 90 may detect an angular velocity about one axis or angular velocities about two axes.

The acceleration sensor 89 and the angular velocity sensor 90 are connected to the processor 81. The detection results of the acceleration sensor 89 and the angular velocity sensor 90 are output to the processor 81. Based on the detection results of the acceleration sensor 89 and the angular velocity sensor 90, the processor 81 can calculate information about a motion and/or orientation of the main body apparatus 2.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 7:
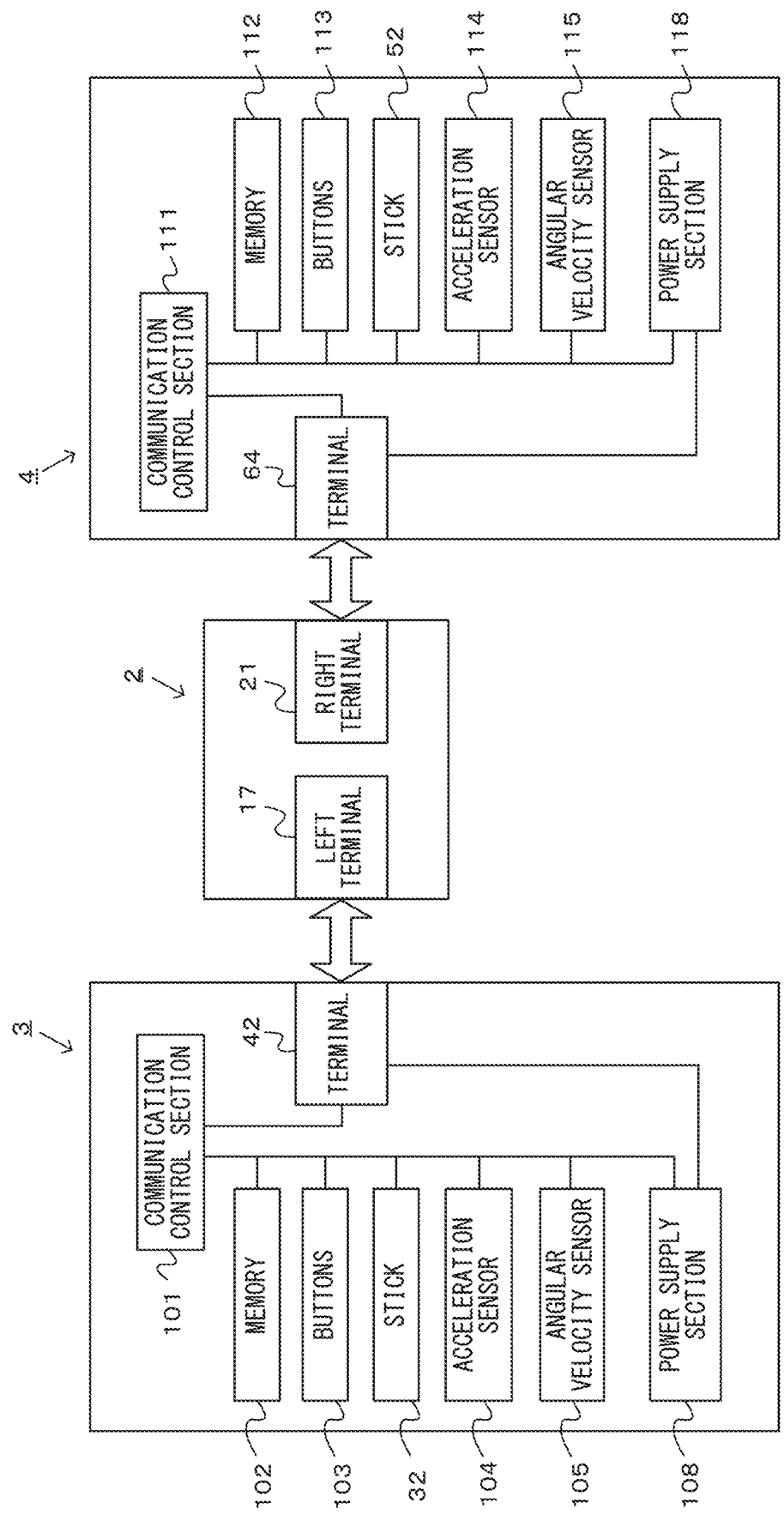
FIG. 7 is a block diagram illustrating examples of internal configurations of a main body apparatus 2, a left controller 3, and a right controller 4.

FIG. 7 is a block diagram illustrating non-limiting examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present non-limiting example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the present non-limiting example, the acceleration sensor 104 detects the magnitudes of accelerations along predetermined three axial (e.g., the x-, y-, and z-axes shown in FIG. 4) directions. It should be noted that the acceleration sensor 104 may detect an acceleration along one axial direction or accelerations along two axial directions. In the present non-limiting example, an angular velocity sensor 105 detects angular velocities about predetermined three axes (e.g., the x-, y-, and z-axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the present non-limiting example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present non-limiting example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to a non-limiting embodiment in which an image is displayed on the display 12. It should be noted that in the case where the game system 1 is used in an embodiment in which an image is displayed on the display 12, the game system 1 may be used with the left controller 3 and the right controller 4 attached to the main body apparatus 2 (e.g., the main body apparatus 2, the left controller 3, and the right controller 4 are integrated in a single housing).

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present non-limiting example, as a non-limiting example, a game in which a player character PC and a field character FC, which perform an action on a field in the virtual space, and characters such as a fighting character BC that fights against the field character FC on the field, are employed, can be played according to the user's operation performed using the operation buttons, the sticks, and the touch panel 13.

Figure 8:
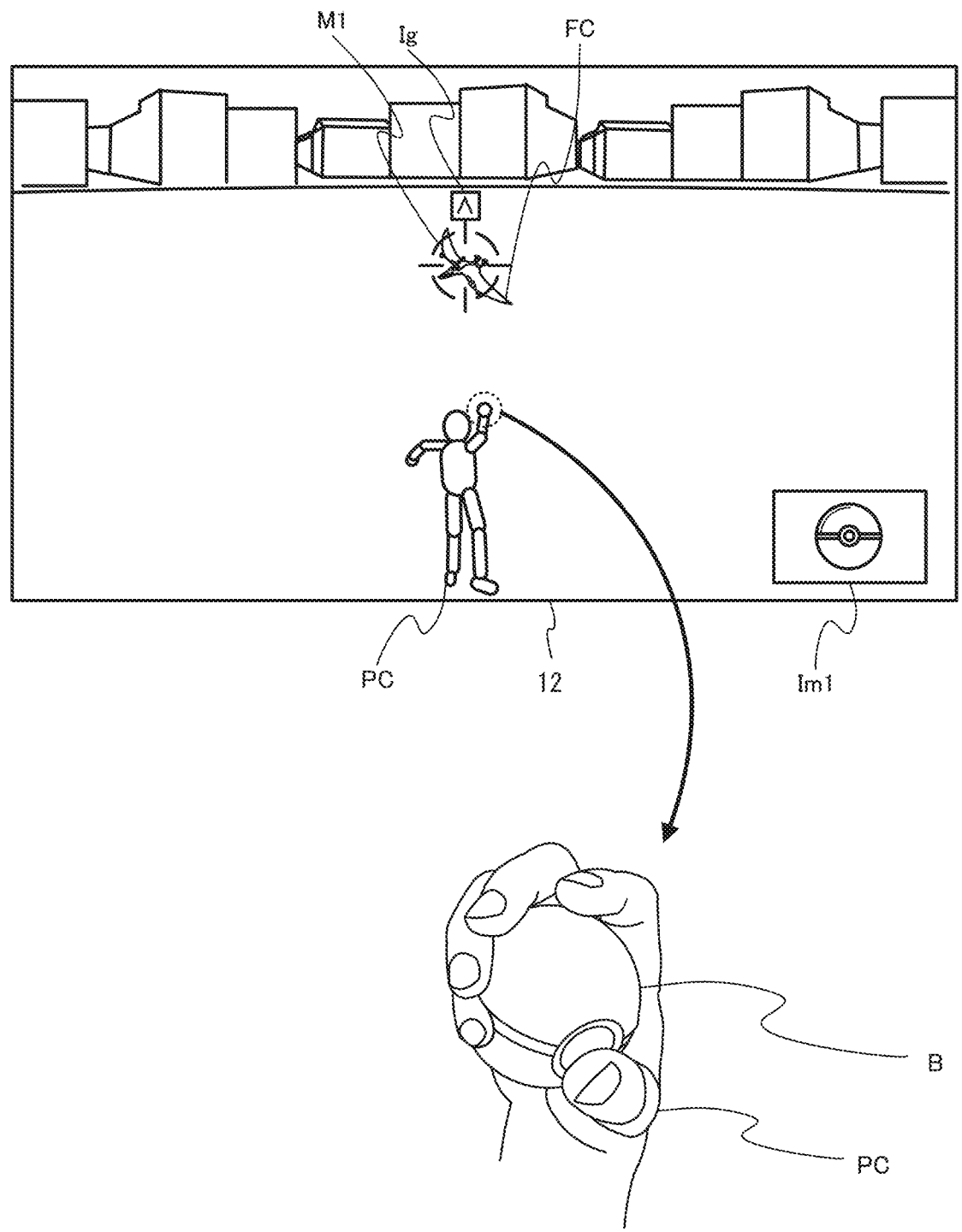
FIG. 8 is a diagram illustrating a non-limiting example of a game image in a first stage of catching of a field character FC.
Figure 9:
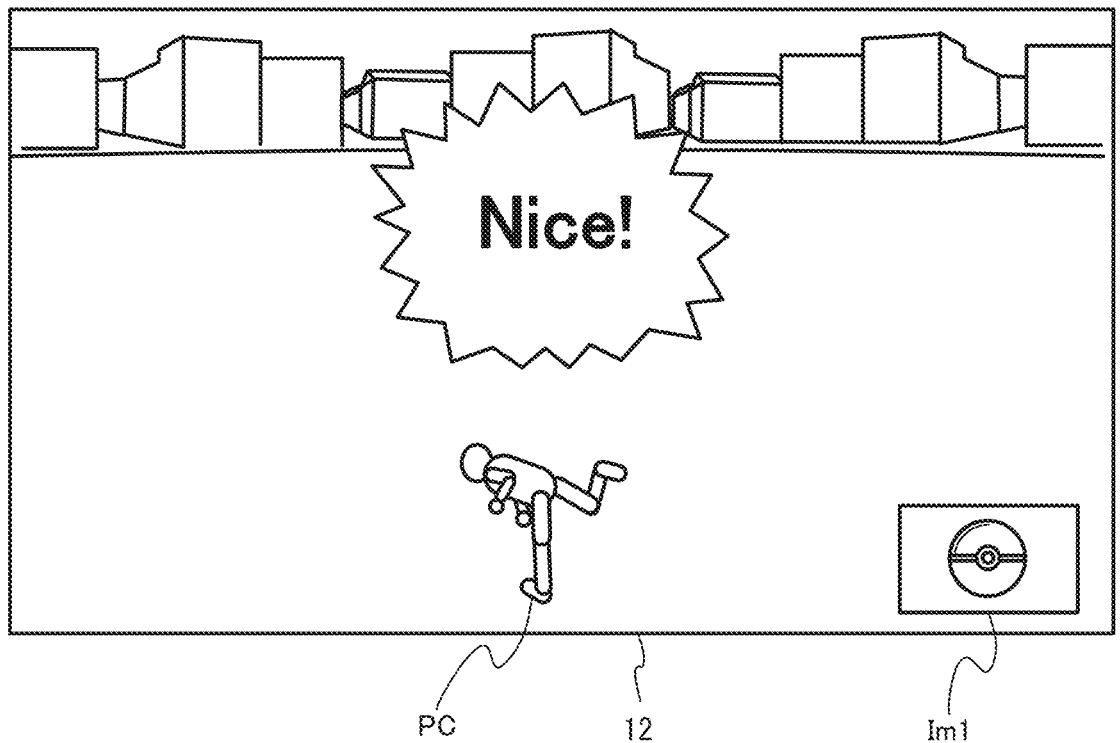
FIG. 9 is a diagram illustrating a non-limiting example of a game image in a second stage of catching of a field character FC.
Figure 11:
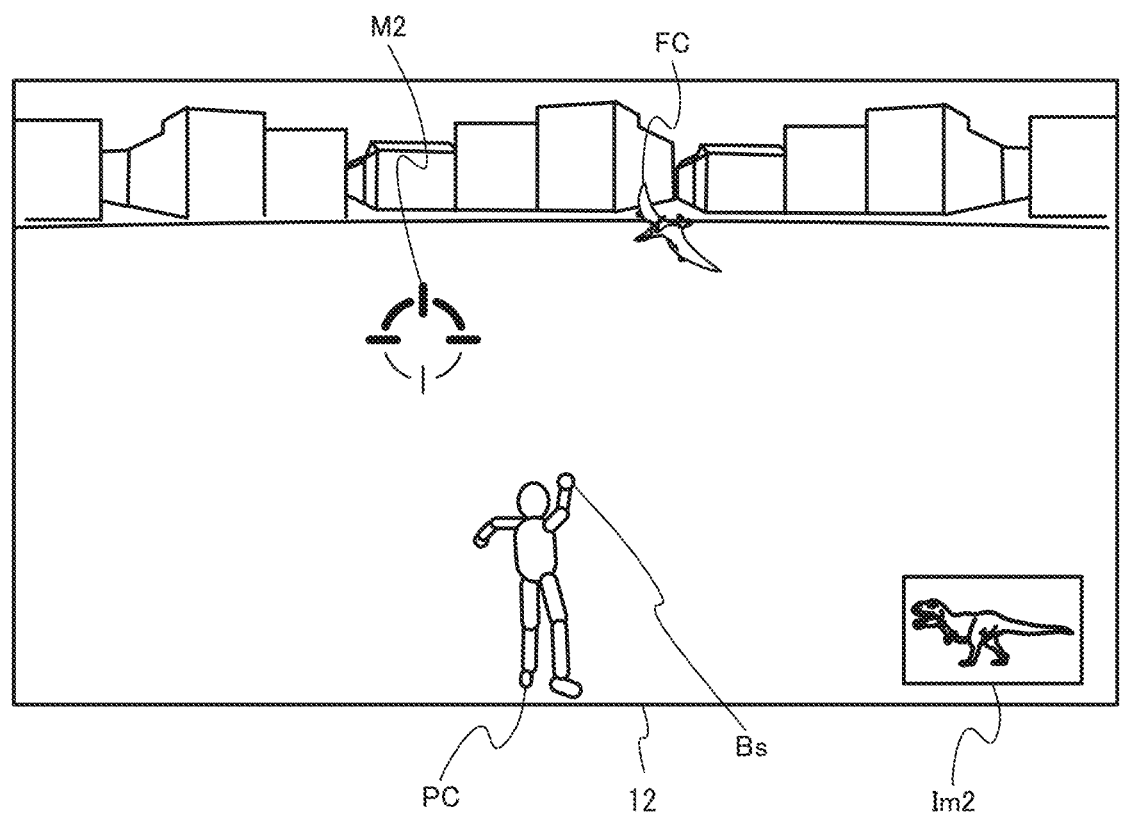
FIG. 11 is a diagram illustrating a non-limiting example of a game image in a first stage of a fight between a field character FC and a fighting character BC.
Figure 12:
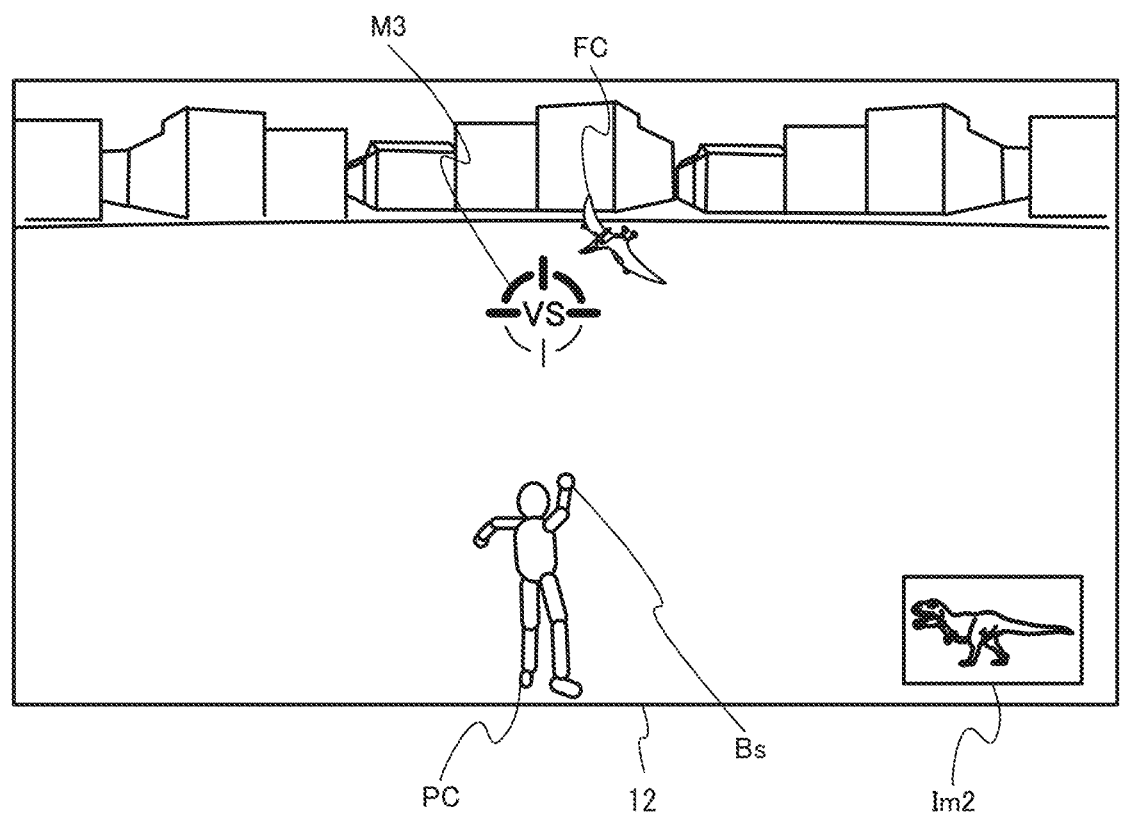
FIG. 12 is a diagram illustrating a non-limiting example of a game image in a second stage of a fight between a field character FC and a fighting character BC.
Figure 13:
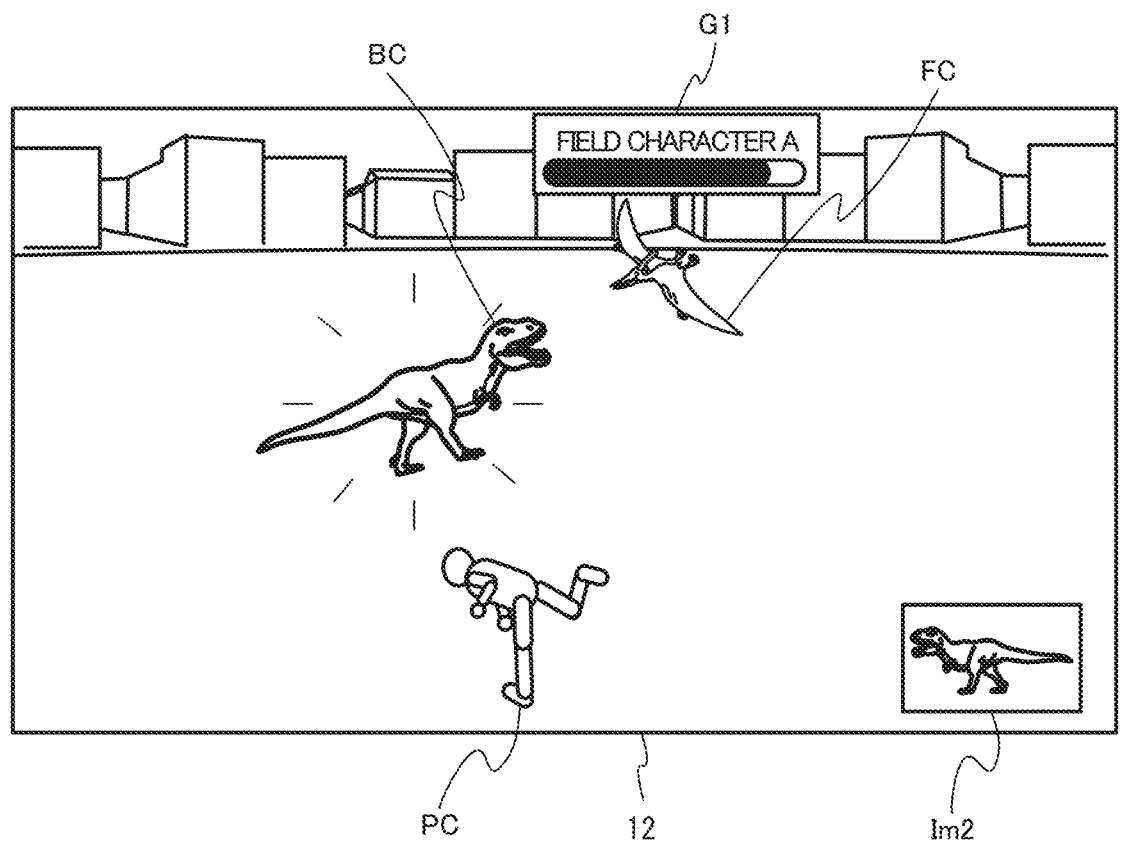
FIG. 13 is a diagram illustrating a non-limiting example of a game image in a third stage of a fight between a field character FC and a fighting character BC.
Figure 14:
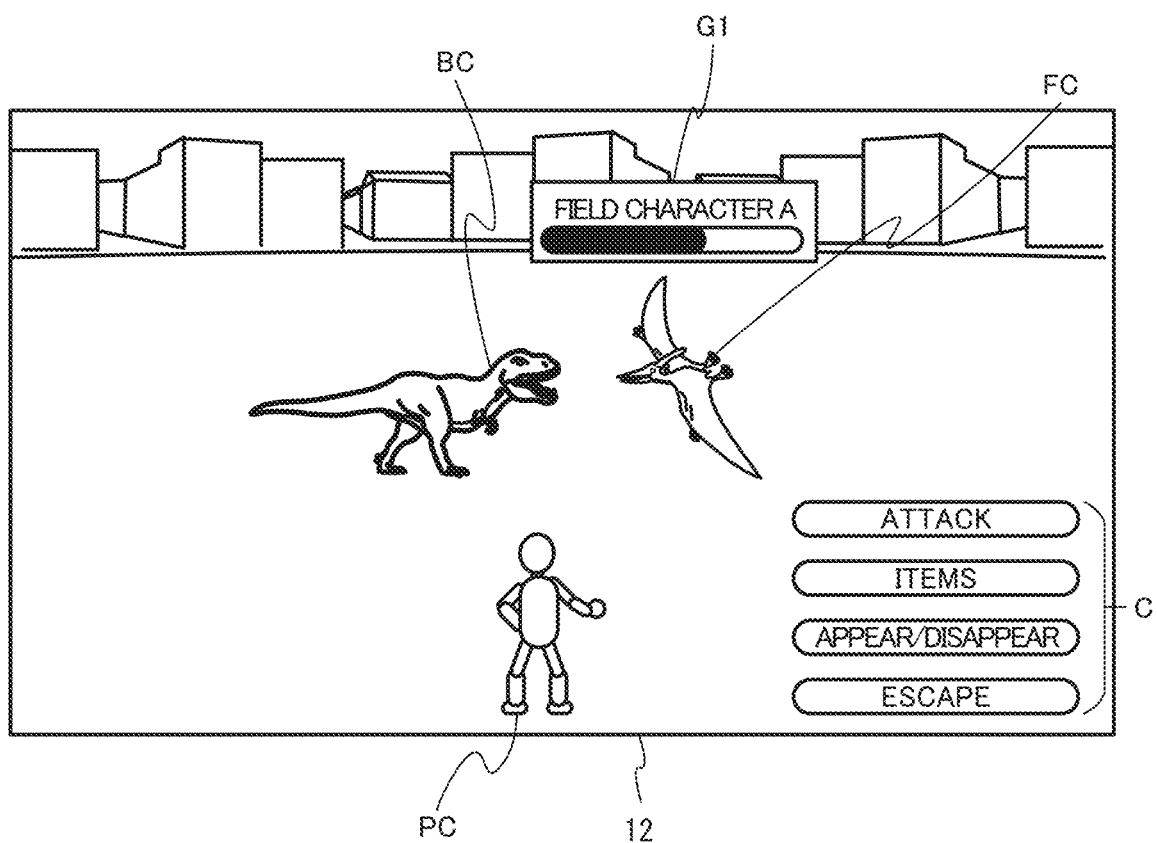
FIG. 14 is a diagram illustrating a non-limiting example of a game image in a fourth stage of a fight between a field character FC and a fighting character BC.
Figure 15:
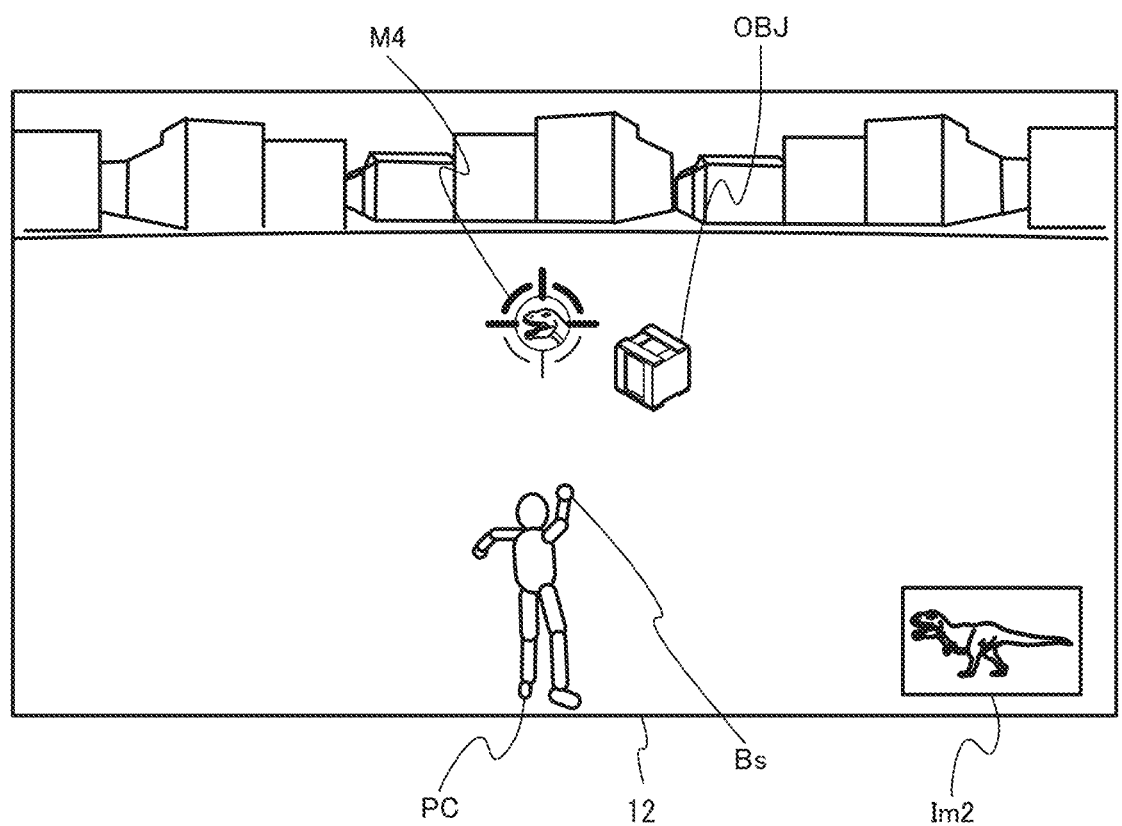
FIG. 15 is a diagram illustrating a non-limiting example of a game image in a first stage of collection of a collection object OBJ by a fighting character BC.
Figure 16:
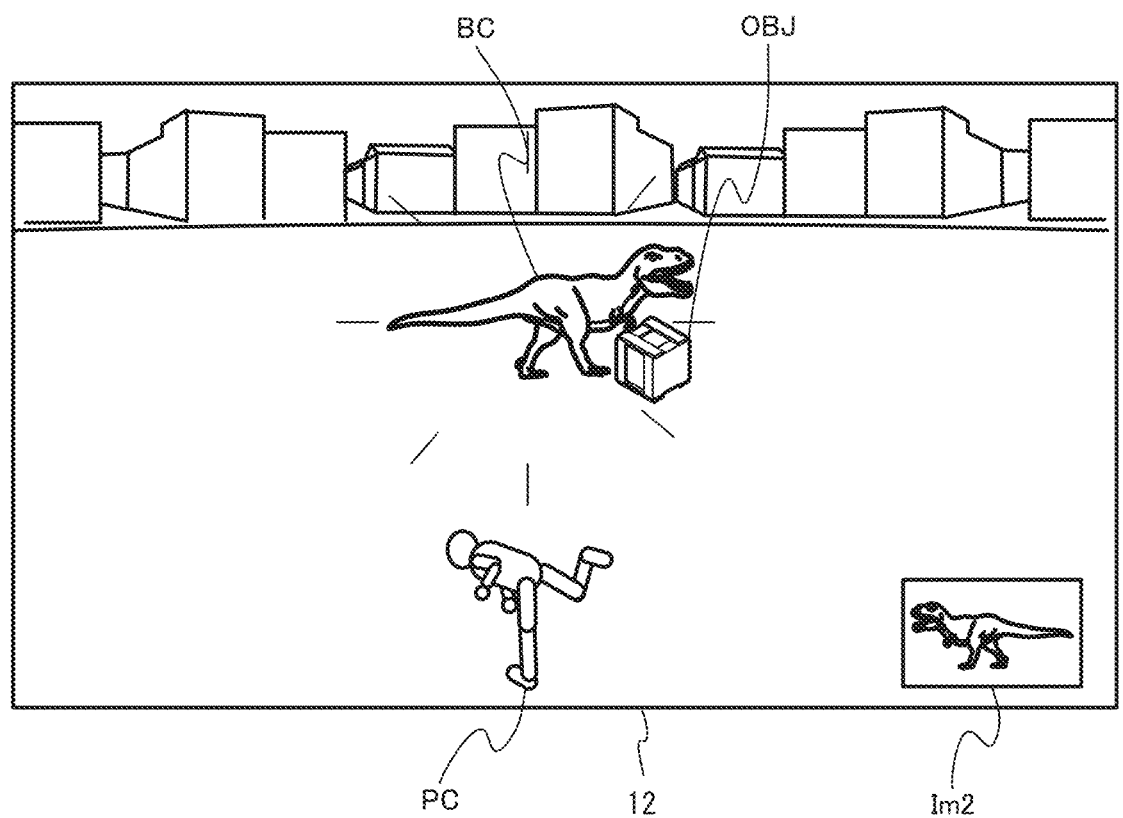
FIG. 16 is a diagram illustrating a non-limiting example of a game image in a second stage of collection of a collection object OBJ by a fighting character BC.
Figure 17:
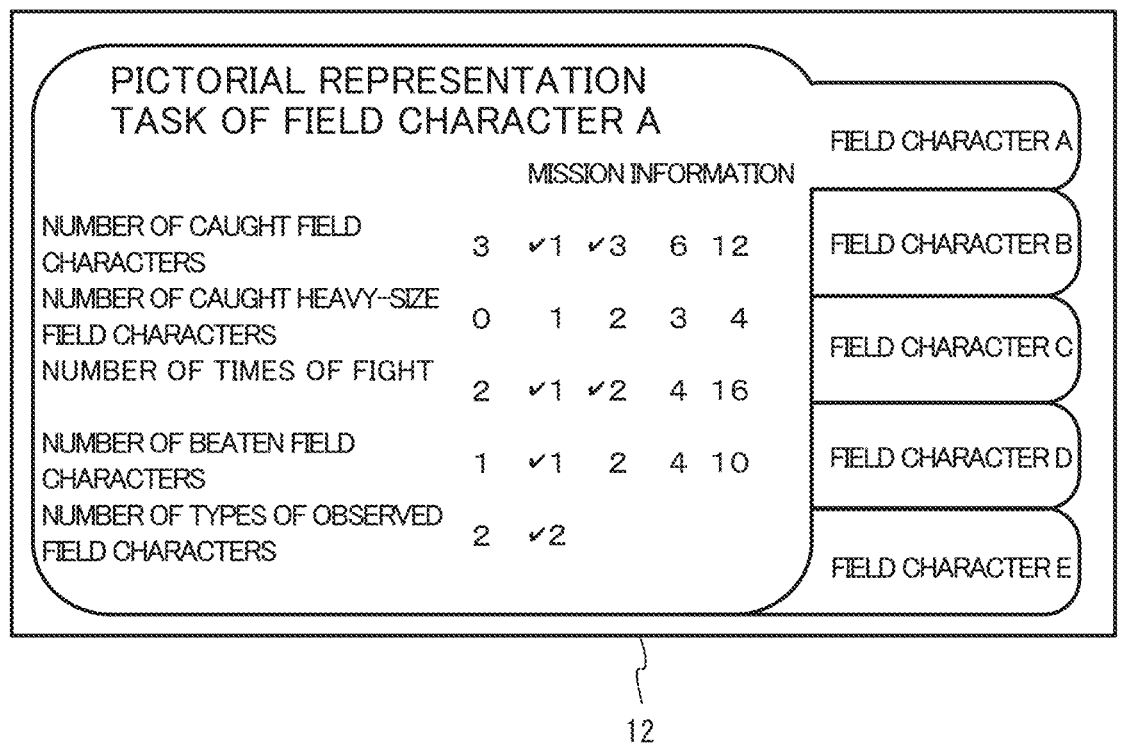
FIG. 17 is a diagram illustrating a non-limiting example of a pictorial representation of a field character FC.
Figure 18:
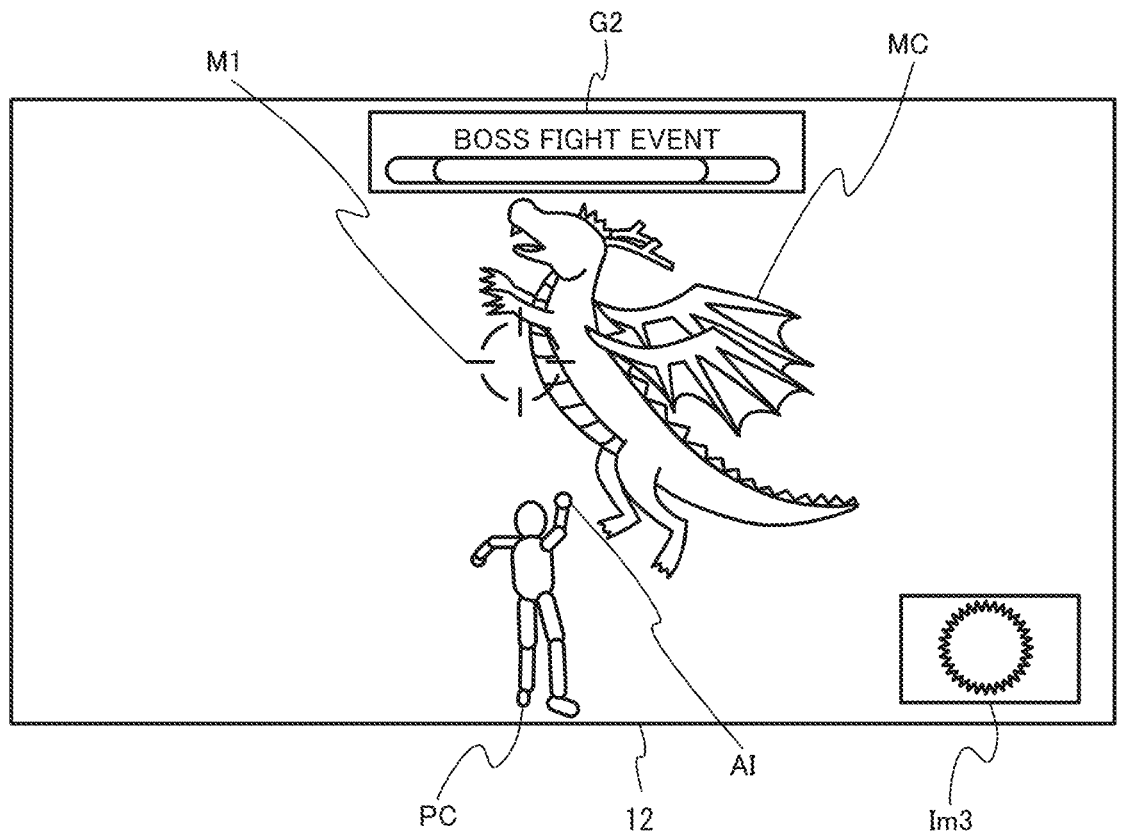
FIG. 18 is a diagram illustrating a non-limiting example of a game image of an attack on a boss character MC.
Figure 19:
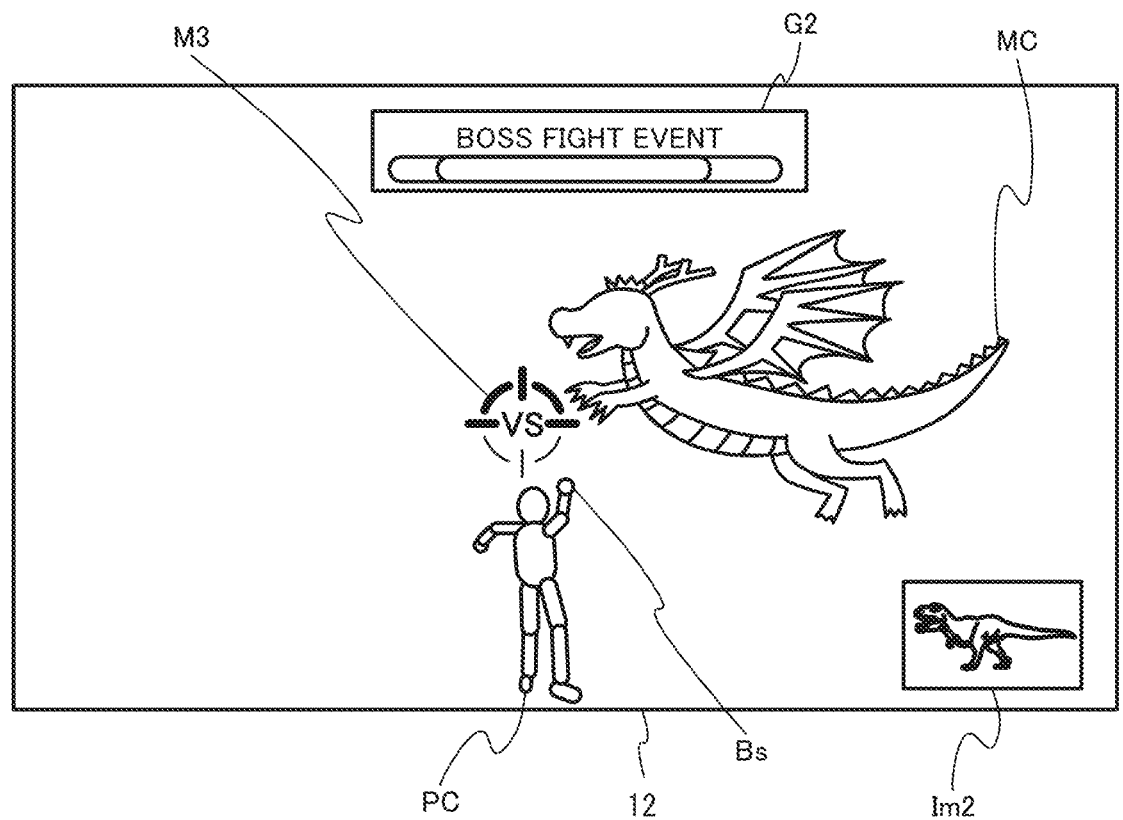
FIG. 19 is a diagram illustrating a non-limiting example of a game image in a first stage of a fight between a boss character MC and a fighting character BC.
Figure 20:
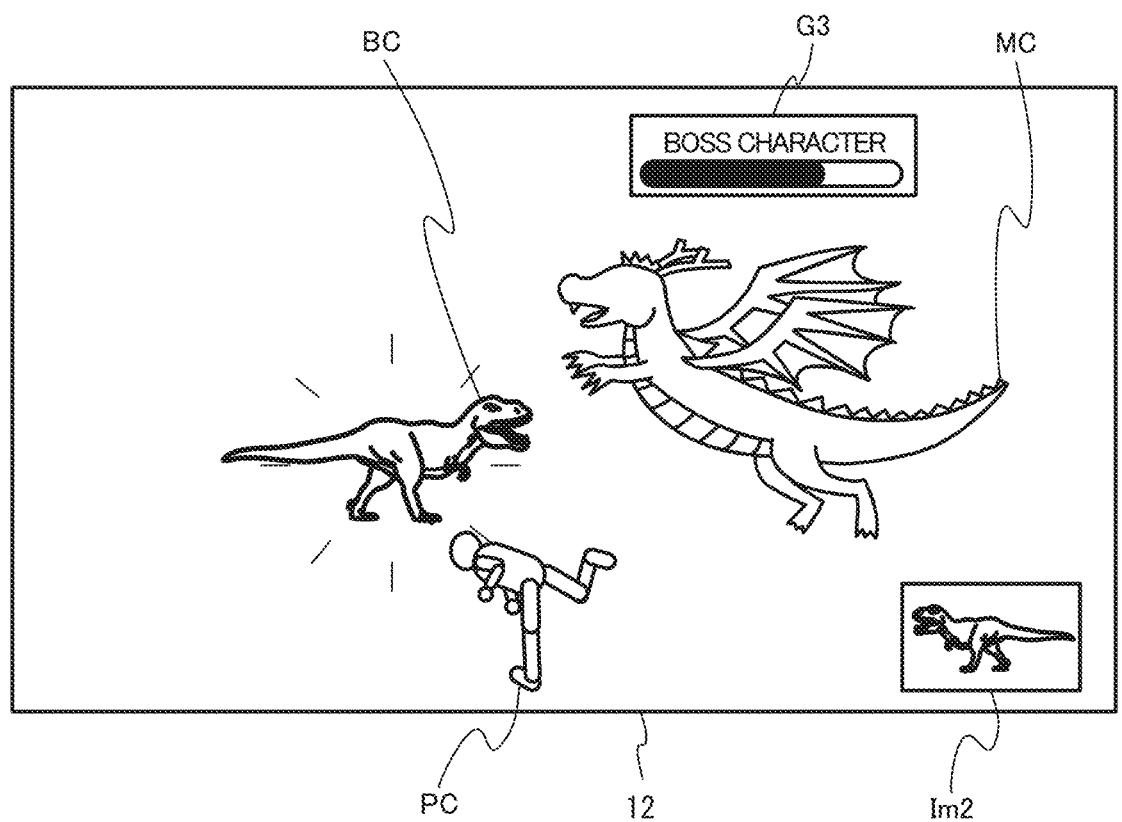
FIG. 20 is a diagram illustrating a non-limiting example of a game image in a second stage of a fight between a boss character MC and a fighting character BC.

An overview of a game process executed in the game system 1 will be given with reference to FIGS. 8 to 20. It should be noted that FIG. 8 is a diagram illustrating a non-limiting example of a game image in a first stage of catching of a field character FC. FIG. 9 is a diagram illustrating a non-limiting example of a game image in a second stage of catching of a field character FC. FIG. 10 is a diagram illustrating a non-limiting example of a game image in a third stage of catching of a field character FC. FIG. 11 is a diagram illustrating a non-limiting example of a game image in a first stage of a fight between a field character FC and a fighting character BC. FIG. 12 is a diagram illustrating a non-limiting example of a game image in a second stage of a fight between a field character FC and a fighting character BC. FIG. 13 is a diagram illustrating a non-limiting example of a game image in a third stage of a fight between a field character FC and a fighting character BC. FIG. 14 is a diagram illustrating a non-limiting example of a game image in a fourth stage of a fight between a field character FC and a fighting character BC. FIG. 15 is a diagram illustrating a non-limiting example of a game image in a first stage of collection of a collection object OBJ by a fighting character BC. FIG. 16 is a diagram illustrating a non-limiting example of a game image in a second stage of collection of a collection object OBJ by a fighting character BC. FIG. 17 is a diagram illustrating a non-limiting example of a pictorial representation of a field character FC. FIG. 18 is a diagram illustrating a non-limiting example of a game image of an attack on a boss character MC. FIG. 19 is a diagram illustrating a non-limiting example of a game image in a first stage of a fight between a boss character MC and a fighting character BC. FIG. 20 is a diagram illustrating a non-limiting example of a game image in a second stage of a fight between a boss character MC and a fighting character BC.

First Non-Limiting Embodiment

A game process according to a first non-limiting embodiment will be described. In the first non-limiting embodiment, a player character PC is caused to perform different actions in different modes, i.e., switch between a first and a second mode. In the first mode, the player character PC is caused to perform an action of launching, at a field character FC as a target on a field, an item that affects a field character FC, according to an operation input for causing the player character PC to perform a launching action in the direction indicated by an aiming point M. In the second mode, the player character PC is caused to perform an action of launching, at a field character FC on a field, a fighting character BC that fights against a field character FC, according to an operation input for causing the player character PC to perform a launching action in the direction indicated by an aiming point M.

In FIG. 8, a game image indicating that the player character PC is disposed in a virtual space is displayed on the display 12 of the game system 1. The player character PC performs an action in the virtual space according to the user's operation. In the game image displayed on the display 12, a field character FC disposed in the virtual space is displayed. A plurality of field characters FC are disposed on the field in the virtual space, and are caused to perform an action in the virtual space by automatic control performed by the processor 81 based on a predetermined algorithm or the like. A user who operates the player character PC can cause the player character PC to perform an action to catch a field character FC, and set the field character FC in the user's possession.

In FIG. 8, the player character PC is holding an empty ball item B, and is about to throw the held ball item B in the virtual space. Here, the empty ball item B serves as a catching item that can be caused to hit a field character FC on the field and thereby catch the field character FC. For example, when an empty ball item B thrown by the player character PC hits a field character, it is determined whether or not the field character is successfully caught (successful-catch determination). If the result of the successful-catch determination is positive, the field character FC hit by the ball item B is successfully caught and set in the user's possession.

For example, the user can cause the player character PC to perform an action of getting into a throwing position for throwing a chosen item (e.g., an action of getting into the position illustrated in FIG. 8), by performing a predetermined operation input (e.g., pressing down the operation button (ZR button) 61). In addition, a direction in which the player character PC throws a chosen item is indicated by an aiming point M. The location of the aiming point M is moved according to a predetermined operation input (e.g., the direction of inclination of the analog stick 32 or 52, the orientation of the body of the left controller 3 or the right controller 4, or the motion or pointed location of the body of the left controller 3 or the right controller 4). Thereafter, when the user ends the operation input for causing the player character PC to perform the action of getting into a throwing position (e.g., the user releases the operation button (ZR button) 61), the player character PC is caused to perform an action of throwing the chosen item in the direction indicated by the aiming point M.

For example, the user can change categories of items to be thrown by the player character PC, by performing a predetermined operation input (e.g., pressing down the operation button (X button) 55). In the first non-limiting embodiment, there are at least the first mode in which a first category including a plurality of items that affect a field character FC is chosen, and the second mode in which a second category including a plurality of fighting characters BC that fight against a field character FC on the field is chosen. The user can change the categories (modes) by pressing down the operation button 55. The user can also choose an item to be thrown by the player character PC from the chosen category, by pressing down the operation button (L button) 38 or the operation button (R button) 60. In the non-limiting example of FIG. 8, projectile information Im1 is displayed, indicating that the first category (first mode) has been chosen, and an empty ball item B has been chosen from the first category by the user. For example, the first category may include a plurality of ball items having different functions or appearances, or items that are other than ball items and that when thrown, support the user in throwing a ball item and catching a field character by, for example, setting a limitation on a movement of the field character.

When an item chosen from the first category is a projectile, a first aiming point M1 (e.g., an aiming point in a normal display form) is displayed. When an empty ball item B that can catch a field character FC is chosen as a projectile from the first category, the location of the first aiming point M1 can be moved by the above operation of moving the aiming point M, or alternatively, the first aiming point M1 can be set (locked on) to a location where the first aiming point M1 is aligned with a field character FC by the user performing a predetermined operation input (e.g., pressing down the operation button (ZL button) 39). When the first aiming point M1 is locked on to the location of a field character FC, a thrown item is more likely to hit the field character FC.

When the first aiming point M1 is locked on to a field character FC, catch information Ig indicating how likely the field character FC is to be caught by hitting the field character FC with an empty ball item B is displayed in the vicinity of the first aiming point M1. For example, an indicator indicating how likely the result of the successful-catch determination is to be positive when an empty ball item B thrown by the player character PC hits a field character FC, is displayed as the catch information Ig. The catch information Ig may be an indicator indicating one of a plurality levels indicating how likely the result of the successful-catch determination is to be positive, or an indicator indicating a numerical value indicating the probability or degree of the positive result of the determination. The catch information Ig may be an indicator representing how likely the result of the successful-catch determination is to be positive, by design or text, a size or motion, a color or lightness, or the like. The catch information Ig may not be displayed on the display 12, and may be represented by sounds, vibrations applied to the controller 3 and/or 4, or the like indicating how likely the result of the successful-catch determination is to be positive.

FIGS. 9 and 10 illustrate game images that are displayed on the display 12, showing that an empty ball item B thrown by the player character PC hits a field character FC, so that the field character FC is successfully caught. For example, the user ends an operation input of causing the player character PC to get into a throwing position (e.g., the user releases the operation button (ZR button) 61), and thereby, can allow the player character PC to perform an action of throwing a chosen item in the direction indicated by the first aiming point M1. When the empty ball item B thrown by the player character PC hits a field character FC, a scene image showing that the field character FC is bit (and/or caught) is displayed as illustrated in FIG. 9. When the field character FC is successfully caught, a scene image showing the field character FC is put into the empty ball item B, which means that the field character FC is caught, is displayed as illustrated in FIG. 10. Thereafter, the field character FC successfully caught is set in the user's possession. It should be noted that the field character FC successfully caught may be allowed to be used as a fighting character BC in the subsequent process by the user.

When the empty ball item B thrown by the player character PC does not hit a field character FC, or the player character PC fails to catch a field character FC, a scene image showing such a situation is displayed on the display 12. Here, when the player character PC fails to catch a field character FC, there may be a disadvantage such as the escape of the field character FC, or the outbreak of a fight due to an attack by the field character FC.

Although it is assumed above that a condition for catching a field character FC is that an empty ball item B thrown by the player character PC hits the field character FC, the field character FC may be caught if the empty ball item B reaches a predetermined range including the location of the field character FC irrespective of whether the empty ball item B hits the field character FC. In that case, how likely it is to catch a field character FC may be changed, depending on whether the field character FC is hit.

In addition, how likely it is to catch a field character FC may be changed according to a state (emotions, endurance, remaining physical strength, size, movement, or the like) of the field character FC to be caught, or the type of an item (e.g., the type of an empty ball item B) thrown by the player character PC. Even when how likely it is to catch a field character FC is changed, the user can know the change from the catch information Ig, which is displayed in the vicinity of the first aiming point M1.

Although in the first non-limiting embodiment, an empty ball item B is used as a non-limiting example of an item that is chosen from the first category (first mode) including a plurality of items that affect a field character FC, the first category may include other types of items. For example, the first category may include an item that slows the movement of a hit field character FC, an item that deprives physical strength of a hit field character FC, an item that changes emotions of a hit field character FC, and an item that attracts a field character FC. By using a combination of these items to hit and attract a field character FC (an item is placed at a location to which a field character FC should be attracted) and the like, the effect of making it more likely to catch a field character FC by throwing a catching item (e.g., an empty ball item B) can be expected.

In FIG. 11, the player character PC is holding a ball item Bs containing a fighting character BC, and is about to throw the held ball item Bs in the virtual space in the second mode. Here, when the ball item Bs containing a fighting character BC is thrown on the field, the fighting character BC appears in the virtual space. For example, when the player character PC throws the ball item Bs at near a field character FC, the fighting character BC appears from the ball item Bs and starts fighting against the field character FC. It should be noted that a fight is directly started on the field without changing places.

For example, the user can cause the player character PC to perform an action of getting into a throwing position for throwing a chosen fighting character BC (ball item Bs) (e.g., an action of getting into the position illustrated in FIG. 11 and FIG. 12), by performing a predetermined operation input (e.g., pressing down the operation button (ZR button) 61). In addition, a direction in which the player character PC throws the chosen fighting character BC (ball item Bs) is indicated by the aiming point M. The location of the aiming point M is moved according to a predetermined operation input (e.g., the direction of inclination of the analog stick 32 or 52, the orientation of the body of the left controller 3 or the right controller 4, or the motion or pointed location of the body of the left controller 3 or the right controller 4). Thereafter, when the user ends the operation input for causing the player character PC to perform the action of getting into a throwing position (e.g., the user releases the operation button (ZR button) 61), the player character PC is caused to perform an action of throwing the chosen fighting character BC (ball item Bs) in the direction indicated by the aiming point M.

As described above, the user can change the category to the second category (second mode) including a plurality of fighting characters BC by performing a predetermined operation input (e.g., pressing down the operation button (X button) 55). Thereafter, the user can choose a fighting character BC that the player character PC is to throw, from the chosen second category, by performing a predetermined operation input (e.g., pressing down the operation button (L button) 38 or the operation button (R button) 60). For example, in the non-limiting examples of FIGS. 11 and 12, projectile information Im2 is displayed, indicating that the second category (second mode) has been chosen, and the user has chosen a predetermined fighting character BC from the second category.

When a fighting character BC (a ball item Bs containing a fighting character BC) is chosen as a projectile from the second category, a second aiming point M2 is displayed. The second aiming point M2 is displayed in a form different that of the first aiming point M1. As a non-limiting example, the second aiming point M2 does not have the normal display form, and is displayed as a colored mark imitating a ball item Bs containing a fighting character BC. By thus displaying the second aiming point M2 in a display form different from that of the first aiming point M1, a projectile that the player character PC is trying to throw can be easily recognized while seeing the aiming point.

As illustrated in FIG. 12, when the second aiming point M2 is disposed, overlaying a range in which a field character FC and a fighting character BC can fight against each other, the second aiming point M2 is changed to a third aiming point M3. The third aiming point M3 is displayed in a display form that is different from those of the first aiming point M1 and the second aiming point M2. As a non-limiting example, the third aiming point M3 is displayed as a mark to which a design indicating a fight is added at a center of the second aiming point M2. By thus displaying the third aiming point M3 in a display form different from those of the first aiming point M1 and the second aiming point M2, the user is allowed to easily recognize that the player character PC can fight against a field character FC by throwing a ball item Bs containing a fighting character BC, while seeing the aiming point.

In FIG. 13, the display 12 displays a game image in which a fighting character BC appearing from a ball item Bs thrown by the player character PC is fighting against a field character FC. For example, the user can cause the player character PC to perform an action of throwing a ball item Bs containing a chosen fighting character BC in the direction indicated by the third aiming point M3 by ending an operation input for causing the player character PC to get into a throwing position (e.g., releasing the operation button (ZR button) 61). When the ball item Bs thrown by the player character PC reaches a range in which the fighting character BC can fight against the field character FC, the fighting character BC appears from that range. Thereafter, the fighting character BC starts fighting against the field character FC. Thus, in the first non-limiting embodiment, by causing the player character PC to perform the same action, i.e., an action of throwing a projectile in the direction indicated by the aiming point M, the field character FC can be subjected to various situations on the field, because the categories (modes) of a projectile can be changed.

While a fighting character BC is fighting against a field character FC, a gauge G1 indicating a state of the field character FC is displayed at a location that is set, corresponding to a location of the field character FC. Here, the state of the field character FC indicated by the gauge G1 indicates at least a parameter related to the remaining physical strength of the field character FC during a fight against the fighting character BC. When an attack on the field character FC by the fighting character BC is effective, the parameter gradually decreases according to the attack. When the remaining physical strength indicated by the gauge G1 is zero, the fighting character BC wins the fight. As described below, the state of the field character FC indicated by the gauge G1 also indicates how likely it is to catch the field character FC during the fight.

As illustrated in FIG. 14, while a fighting character BC is fighting against a field character FC, the user can control actions of the player character PC and/or the fighting character BC by choosing commands. For example, while a fighting character BC is fighting against a field character FC, a plurality of command-indicating images C for allowing the user to choose a command are displayed. For example, in FIG. 14, as a non-limiting example of the command-indicating images C, an attack command, an item command, an appear/disappear command, and an escape command are displayed. The user can choose any of the commands by performing an operation input using an input section provided on the left controller 3 or the right controller 4, or the touch panel 13 of the main body apparatus 2.

The user can control an action of a fighting character BC by performing an operation input for choosing the attack command. As a non-limiting example, when the attack command is chosen, the user is prompted to choose one of a plurality of kinds of attack. By performing an operation of choosing one from the plurality of kinds of attack, the user can cause a fighting character BC to perform an attack action corresponding to the chosen kind of attack.

The user can control an action of the player character PC by performing an operation input for choosing the item command. As a non-limiting example, when the item command is chosen, the user is prompted to choose one of a plurality of items including a catching item. By performing an operation of choosing an item to be used from the plurality of items, the user can cause the player character PC to perform an action of using the chosen item. As a non-limiting example, by performing an operation of choosing a catching item for catching a field character FC during the fight, the user can cause the player character PC to perform an action of catching a field character FC using the catching item.

A catching item used during a fight may be the same as or similar to the above ball item B. For example, when the command to use a catching item is chosen during the fight, a scene that the player character PC throws a catching item at a field character FC during the fight is displayed. As to whether or not the field character FC is successfully caught, successful-catch determination is performed as in the non-fight state. During the fight, the successful-catch determination is performed based on a state of the field character FC that is changed during the fight, i.e., the state of the field character FC indicated by the gauge G1. Specifically, when a state (e.g., the remaining physical strength) of the field character FC changed due to the fight is reduced to a predetermined state, the result of the successful-catch determination is more likely to be positive. It should be noted that the above threshold may be changed according to at least one of the type of the field character FC, the type of the chosen catching item, an ability value of the player character PC, an ability value of the fighting character BC, and the like. Even when the result of the successful-catch determination is positive during the fight, the field character FC is caught by the command using the catching item, and is set in the user's possession. As another non-limiting example, while a fighting character BC is fighting against a field character FC, the player character PC may be caused to perform an action of catching the field character FC using a catching item, by performing an operation input of causing the player character PC to perform an action of throwing the catching item at the aiming point M as in catching instead of the operation of choosing a command unlike the above fight.

The user can cause a fighting character BC to disappear during the fight or can cause another fighting character BC to appear during the fight, by performing an operation input of choosing the appear/disappear command. It should be noted that the existing fighting character BC may be replaced by another fighting character BC that newly appears, or in addition to the existing fighting character BC, another fighting character BC may newly appear. As a non-limiting example, when the appear/disappear command is chosen, the user is prompted to choose one of a plurality of characters that is to appear, and by operating an operation of choosing the one from the plurality of characters, the user can cause the player character PC to perform an action of causing the chosen character to appear as a fighting character BC.

The user can end a fight between a fighting character BC and a field character FC, and control an action of the player character PC such that the player character PC performs an action of escaping from the field character FC, by performing an operation input of choosing the escape command. At that time, the appearing fighting character BC may be collected by the player character PC to disappear from the field, or may be left as it is on the field.

Thus, in a fight between a fighting character BC and a field character FC, the field character FC can be caught by choosing the command to use a catching item as in the non-fight state. Therefore, the user can choose whether to catch a field character FC without fighting against the field character FC using a fighting character BC, or to catch a field character FC by performing the fight, resulting in a game having various strategic aspects.

Although in the first non-limiting embodiment, a fighting character BC is released in the virtual space by the player character PC throwing a ball item Bs containing the fighting character BC in the direction indicated by the aiming point M, a fighting character BC may be released in the virtual space by the player character PC directly throwing the fighting character BC.

The location and orientation of a virtual camera for generating a game image to be displayed on the display 12 may be set such that the virtual camera is located behind the player character PC, and the player character PC is included in the range of view of the virtual camera, or such that the first-person point of view of the player character PC is provided. In either case, the location and/or orientation of the virtual camera may be changeable according to the user's operation input. In that case, a field character FC may be out of the range of view during the fight or the gauge G1 indicating a state of the field character FC may be out of the display range, depending on the location or orientation of the player character PC in the virtual space. If the location and/or orientation of the virtual camera are changeable according to the user's operation input even during a fight between a fighting character BC and a field character FC, then when a fight between a field character FC and a fighting character BC starts without the field character FC being displayed, the gauge G1 indicating a state of the field character FC, i.e., an indicator affecting catching of the field character FC, can be displayed according to the user's operation. The player character PC may be allowed to freely move during a fight according to the user's operation input. Therefore, no matter what kind of situation a fight starts in, the camera can be subsequently appropriately changed by the user. Therefore, a fight can be caused to start freely irrespective of situations.

In addition, in the first non-limiting embodiment, a fighting character BC appearing from a ball item Bs can be caused to perform an action different from that during the fight on the field. For example, in the first non-limiting embodiment, when the player character PC throws a ball item Bs containing a fighting character BC on the field in the virtual space, the fighting character BC may be caused to merely appear on the field, or the fighting character BC may be caused to appear and perform a predetermined action on a virtual object OBJ disposed on the field.

For example, as illustrated in FIG. 15, a collection object OBJ is disposed on the field in the virtual space. In the first non-limiting embodiment, the player character PC may collect the collection object OBJ by directly touching the collection object OBJ, and a fighting character BC may be caused to appear and collect the collection object OBJ.

In FIG. 15, the player character PC is holding a ball item Bs containing a fighting character BC as in the state of FIG. 11, and is performing an action of getting into a throwing position for throwing the chosen fighting character BC (ball item Bs), according to a predetermined operation input (e.g., pressing down the operation button (ZR button) 61). In the non-limiting example of FIG. 15, the projectile information Im2 is displayed, indicating that the second category (second mode) has been chosen, and a predetermined fighting character BC has been chosen from the second category by the user.

As described above, when a fighting character BC (a ball item Bs containing the fighting character BC) chosen from the second category is a projectile, the second aiming point M2 is displayed. When the second aiming point M2 is disposed, overlaying the range in which an action of collecting a collection object OBJ is allowed, the second aiming point M2 is changed to a fourth aiming point M4. The fourth aiming point M4 is displayed in a display form different from those of the first aiming point M1, the second aiming point M2, and the third aiming point M3. As a non-limiting example, the fourth aiming point M4 is displayed as a mark in which a design imitating a portion of the fighting character BC is added at a center of the second aiming point M2. Thus, by displaying the fourth aiming point M4 in a display form different from those of the first aiming point M1, the second aiming point M2, and the third aiming point M3, it is more easily recognized that the field character FC can be caused to appear in a state different from the fight state by throwing the ball item Bs containing the fighting character BC, while seeing the aiming point.

In FIG. 16, a game image that a fighting character BC appearing from a ball item Bs thrown by the player character PC is collecting a collection object OBJ is displayed on the display 12. For example, the user stops performing an operation input for causing the player character PC to perform an action of getting into a throwing position (e.g., the user releases the operation button (ZR button) 61), and thereby can cause the player character PC to perform an action of throwing a ball item Bs containing a chosen fighting character BC in the direction indicated by the fourth aiming point M4. When the ball item Bs thrown by the player character PC reaches a range in which the player character PC can collect a collection object OBJ, the fighting character BC appears from the range. Thereafter, the fighting character BC starts collecting the collection object OBJ.

In the first non-limiting embodiment, information about a field character FC to which the aiming point M is locked on can be displayed (pictorial representation). For example, when a predetermined operation input (e.g., pressing down the operation button (down button) 34 or the down button of the directional pad) is performed with the first aiming point M1 locked on to the field character FC as illustrated in FIG. 8, i.e., an operation of displaying a pictorial representation is performed while performing an operation of locking the first aiming point M1 on to the field character FC, information about the field character FC is displayed as illustrated in FIG. 17. Here, information about a field character FC includes mission information about a history of missions in a game including at least the number of field characters FC to which the aiming point M is locked on and which have been caught by the player character PC and the number of times of a fight against the field character FC. In a non-limiting example of a pictorial representation of field characters FC illustrated in FIG. 17, for a field character A of a plurality of field characters FC to which the aiming point M is locked on, the history of each of features such as the number of catches (the number of times a field character A was caught), the number of heavy size catches (the number of times a relatively heavy field character A was caught), the number of times of a fight (the number of times of a fight against a field character A), the number of beaten field characters A (the number of field characters A that were beaten during a fight), and the number of types of observed field characters A (the number of types of field characters A that appeared in the virtual space and were displayed on the display 12) is displayed as information about the field character FC. In the non-limiting example of the pictorial representation of field characters FC of FIG. 17, a mission to be accomplished and the progress of the mission are displayed for each feature. As a non-limiting example, as the mission information, for each feature of the pictorial representation, a value required for accomplishing a mission (the number of times required for accomplishing a mission) is displayed for each stage. For a mission that has already been accomplished, a mark (check mark in the non-limiting example of FIG. 17) indicating that the mission already has been accomplished is given to the value required for accomplishing the mission.

Thus, the history information of a mission to be accomplished for a field character FC on the field is displayed, and can be referenced for choosing whether to catch the field character FC or fight against the field character FC. It should be noted that information about a field character FC different from the field character A to which an aiming point is locked on may also be displayed. For example, in the non-limiting example of FIG. 17, a tag is provided at a right end of a display screen for each field character FC (e.g., field characters A to E), and information about the other field characters FC can be displayed by performing an operation of choosing the respective corresponding tags.

Second Non-Limiting Embodiment

A game process according to a second non-limiting embodiment will be described. In this non-limiting embodiment, a player character PC can fight against a boss character MC that is a non-limiting example of a field character disposed on a field in a virtual space. In the second non-limiting embodiment, a game process is performed on the boss character MC. Here, the boss character MC appears on the same field in the same virtual space on which a field character FC appears, and attacks the player character PC and moves toward the player character PC. Therefore, the user may operate the player character PC such that the player character PC escapes an attack from the boss character MC, or the player character PC hits the boss character MC with a boss attack item AI. In the second non-limiting embodiment, the player character PC is caused to perform different actions in different modes, i.e., switch between a first and a second mode. In the first mode, the player character PC is caused to perform an action of launching, at the boss character MC as a target on the field, an item that affects the boss character MC, according to an operation input for causing the player character PC to perform a launching action in the direction indicated by an aiming point M. In the second mode, the player character PC is caused to perform an action of launching, at the boss character MC on the field, a fighting character BC that fights against the boss character MC, according to an operation input for causing the player character PC to perform a launching action in the direction indicated by an aiming point M.

In FIG. 18, a game image that the player character PC and the boss character MC are disposed in the virtual space is displayed on the display 12. For example, the boss character MC appears in the virtual space in a special event (e.g., a boss fight event) during progression of a game, and is operated on the field in the virtual space by automatic control performed by the processor 81 based on a predetermined algorithm or the like as with a field character FC. The user who operates the player character PC can cause the player character PC or a fighting character BC to fight against the boss character MC. It should be noted that the boss character MC may be forbidden to be caught, unlike the above field character FC.

In FIG. 18, the player character PC is holding a boss attack item AI, and is about to throw the held boss attack item AI in the virtual space. Here, the boss fight event can be progressed by hitting the boss character MC on the field with the boss attack item AI. For example, a boss state parameter that indicates a state of the boss character MC in the boss fight event is provided. The boss state parameter is reduced when the boss attack item AI hits the boss character MC. As a non-limiting example, when the boss attack item AI thrown by the player character PC hits the boss character MC, the attack is assessed based on the site of the hit, the state of the boss character MC, and the like, and a reduction amount based on the assessment of the attack is subtracted from the boss state parameter of the boss character MC. When the boss state parameter is reduced to reach a threshold (e.g., zero), the boss character MC is beaten, so that the boss fight event is cleared. In the non-limiting example of a game image of FIG. 18, a gauge G2 indicating the remaining amount of the boss state parameter of the boss character MC is displayed at an upper portion of a display screen.

In the boss fight event, the user can also cause the player character PC to perform an action of getting into a throwing position for throwing a chosen boss attack item AI (e.g., an action of getting into the position illustrated in FIG. 18) by performing a predetermined operation input (e.g., pressing down the operation button (ZR button) 61). A direction in which the player character PC throws a chosen boss attack item AI is indicated by a first aiming point M1. The location of the first aiming point M1 is moved according to a predetermined operation input (e.g., the direction of inclination of the analog stick 32 or 52, the orientation of the body of the left controller 3 or the right controller 4, or the motion or pointed location of the body of the left controller 3 or the right controller 4). Thereafter, when the user ends the operation input for causing the player character PC to perform the action of getting into a throwing position (e.g., the user releases the operation button (ZR button) 61), the player character PC is caused to perform an action of throwing the chosen boss attack item AI in the direction indicated by the first aiming point M1.

In the boss fight event, the user can also change categories of an item to be thrown by the player character PC, by performing a predetermined operation input (e.g., pressing down the operation button (X button) 55). In the second non-limiting embodiment, there are at least the first mode in which a first category including a plurality of items that affect the boss character MC is chosen, and the second mode in which a second category including a plurality of fighting characters BC that fight against the boss character MC on the field is chosen. The user can change the categories (modes) by pressing down the operation button 55. The user can also choose an item to be thrown by the player character PC from the chosen category, by pressing down the operation button (L button) 38 or the operation button (R button) 60. For example, in the non-limiting example of FIG. 18, projectile information Im3 is displayed, indicating that the first category (first mode) has been chosen, and a boss attack item AI has been chosen from the first category by the user. In the boss fight event, when a boss attack item AI is chosen as a projectile from the first category, the first aiming point M1 (e.g., an aiming point in a normal display form) is also displayed.

As described above, when the user ends the operation input of causing the player character PC to perform an action of getting into a throwing position (e.g., the user releases the operation button (ZR button) 61), the player character PC can be caused to perform an action of throwing a chosen boss attack item AI in the direction indicated by the first aiming point M1. When the boss attack item AI thrown by the player character PC hits the boss character MC, the boss state parameter of the boss character MC is reduced based on the above attack assessment. When the boss attack item AI thrown by the player character PC fails to hit the boss character MC, the boss state parameter of the boss character MC is maintained, or the boss state parameter is increased by a predetermined amount.

Although in the foregoing, a condition for reducing the boss state parameter of the boss character MC is that a boss attack item AI thrown by the player character PC hits the boss character MC, the boss state parameter of the boss character MC may be reduced if the boss attack item AI reaches a predetermined range including the location of the boss character MC irrespective of whether the boss attack item AI directly hits the boss character MC . . . .

Although in the second non-limiting embodiment, a boss attack item AI is used as a non-limiting example of an item chosen from the first category (first mode) including a plurality of items that affect the boss character MC, the first category may include other types of items. For example, the first category may include an item that slows the movement of the boss character MC when the item hits the boss character, an item that changes emotions of the boss character MC when the item hits the boss character, and an item that attracts the boss character MC. By using a combination of these items to hit and attract the boss character MC (an item is placed at a location to which the boss character MC should be attracted) and the like, the effect of making it more likely for a boss attack item AI to hit the boss character MC can be expected.

In the second non-limiting embodiment, a fighting character BC may be caused to appear on the field and fight against the boss character MC. In FIG. 19, the player character PC is holding a ball item Bs containing a fighting character BC, and is about to throw the held ball item Bs in the virtual space. Here, when the ball item Bs containing a fighting character BC is thrown on the field in the boss fight event, the fighting character BC appears in the virtual space. For example, when the player character PC throws the ball item Bs at near the boss character MC, the fighting character BC appears from the ball item Bs and starts fighting against the boss character MC. It should be noted that a fight is directly started on the field without changing places.

For example, in the boss fight event, the user can also cause the player character PC to perform an action of getting into a throwing position for throwing a chosen fighting character BC (ball item Bs) (e.g., an action of getting into the position illustrated in FIG. 19), by performing a predetermined operation input (e.g., pressing down the operation button (ZR button) 61). In addition, a direction in which the player character PC throws the chosen fighting character BC (ball item Bs) is indicated by a second aiming point M2. The location of the second aiming point M2 is moved according to a predetermined operation input (e.g., the direction of inclination of the analog stick 32 or 52, the orientation of the body of the left controller 3 or the right controller 4, or the motion or pointed location of the body of the left controller 3 or the right controller 4). As illustrated in FIG. 19, in the boss fight event, when the second aiming point M2 is disposed, overlaying a range in which the boss character MC and the fighting character BC can fight against each other, the second aiming point M2 is changed to a third aiming point M3.

In the boss fight event, the user can also change the category to the second category (second mode) including a plurality of fighting characters BC by performing a predetermined operation input (e.g., pressing down the operation button (X button) 55). Thereafter, the user can choose a fighting character BC that the player character PC is to throw, from the chosen second category, by performing a predetermined operation input (e.g., pressing down the operation button (L button) 38 or the operation button (R button) 60). For example, in the non-limiting examples of FIGS. 19 and 20, projectile information Im2 is displayed, indicating that the second category (second mode) has been chosen, and the user has chosen a predetermined fighting character BC from the second category.

In FIG. 20, a game image that a fighting character BC appearing from a ball item Bs thrown by the player character PC is fighting against the boss character MC is displayed on the display 12. For example, in the boss fight event, the user can also cause the player character PC to perform an action of throwing a ball item Bs containing a chosen fighting character BC in the direction indicated by the third aiming point M3 by ending an operation input for causing the player character PC to get into a throwing position (e.g., releasing the operation button (ZR button) 61). When the ball item Bs thrown by the player character PC reaches a range in which the fighting character BC can fight against the boss character MC, the fighting character BC appears from that range. Thereafter, the fighting character BC starts fighting against the boss character MC. Thus, in the second non-limiting embodiment, by causing the player character PC to perform the same action, i.e., an action of throwing a projectile in the direction indicated by the aiming point M, the boss character MC can be subjected to various situations on the field, because the categories (modes) of a projectile can be changed.

While a fighting character BC is fighting against the boss character MC, a gauge G3 indicating a state of the boss character MC is displayed at a location that is set, corresponding to a location of the boss character MC. Here, the state of the boss character MC indicated by the gauge G3 indicates at least a parameter related to the remaining physical strength of the boss character MC during a fight against the fighting character BC. When an attack on the boss character MC by the fighting character BC is effective, the parameter gradually decreases according to the attack. When the remaining physical strength of the boss character MC indicated by the gauge G3 is zero, the fighting character BC wins the fight.

While a fighting character BC is fighting against the boss character MC, the user can control an action of the fighting character BC by choosing a command. As a non-limiting example, by performing an operation of choosing one from a plurality of attack commands, the user can cause a fighting character BC to perform an attack action corresponding to the chosen attack command.

When a fighting character BC wins a fight against the boss character MC, a condition for clearing the boss fight event is adjusted so as to be more easily satisfied. As a first non-limiting example, when a fighting character BC wins a fight against the boss character MC, a limitation is set on the movement in the virtual space of the boss character MC during at least a predetermined period of time. This allows the user to more easily hit the boss character MC with a boss attack item AI, and therefore, to more easily reduce the boss state parameter for clearing the boss fight event, so that the condition for clearing the boss fight event is more easily satisfied. As a second non-limiting example, when a fighting character BC wins a fight against the boss character MC, the amount of a reduction in the boss state parameter corresponding to hitting of the boss character MC with a boss attack item AI is relatively increased during at least a predetermined period of time. This allows the user to more easily reduce the boss state parameter, so that the condition for clearing the boss fight event is more easily satisfied. As a third non-limiting example, when a fighting character BC wins a fight against the boss character MC, the boss state parameter as of the end of the fight is reduced by a predetermined amount. This allows the user to more easily reduce the boss state parameter, so that the condition for clearing the boss fight event is more easily satisfied. It should be noted that in the second non-limiting embodiment, by combining at least two of the above non-limiting examples, the condition for clearing the boss fight event may be adjusted so as to be more easily satisfied.

It should be noted that a fight between a fighting character BC and the boss character MC in the boss fight event may be allowed to start only when the boss character MC is in a predetermined state. For example, the predetermined state may be a state that the boss character MC is in an unguarded moment, a state that the boss character MC is in a predetermined position, a state that the boss state parameter of the boss character MC has reached a predetermined value, a state that a predetermined period of time has passed since the start of the boss fight event, or the like. In addition, the fight may not be forbidden to start in a state that a fighting character BC does not appear even when the player character PC throws a ball item Bs, a state that the player character PC does not perform a throwing action even when the user performs an operation input for causing the player character PC to perform a throwing action, a state that a ball item Bs cannot be chosen as a projectile, or the like.

Thus, in the second non-limiting embodiment, in the boss fight event, in which the boss character MC appears, an operation of throwing an item that affects the boss character MC (boss attack item AI) in the direction indicated by an aiming point, and an operation of throwing a fighting character BC that fights against the boss character MC in the direction indicated by an aiming point, can be allowed, and therefore, the user can choose whether to attack the boss character MC using an item or attack the boss character MC using a fighting character BC, resulting in a game having various strategic aspects.

In the boss fight event, the location and orientation of a virtual camera for generating a game image to be displayed on the display 12 may be set such that the virtual camera is located behind the player character PC, and the player character PC is included in the range of view of the virtual camera, or such that the first-person point of view of the player character PC is provided. In either case, the location and/or orientation of the virtual camera may be changeable according to the user's operation input.

In the first and second non-limiting embodiments, the player character PC performs a throwing action in the direction indicated by an aiming point in different modes that can be changed, i.e., the first and second modes. A larger number of modes may be provided. For example, there may be a category including a plurality of items that affect a fighting character BC, a category including a plurality of items that affect a collection object OBJ, a category including a plurality of items that affect the player character PC, a category including a plurality of items that affect the virtual space, and the like. By allowing choice of these categories, three or more modes may be changed.

Figure 21:
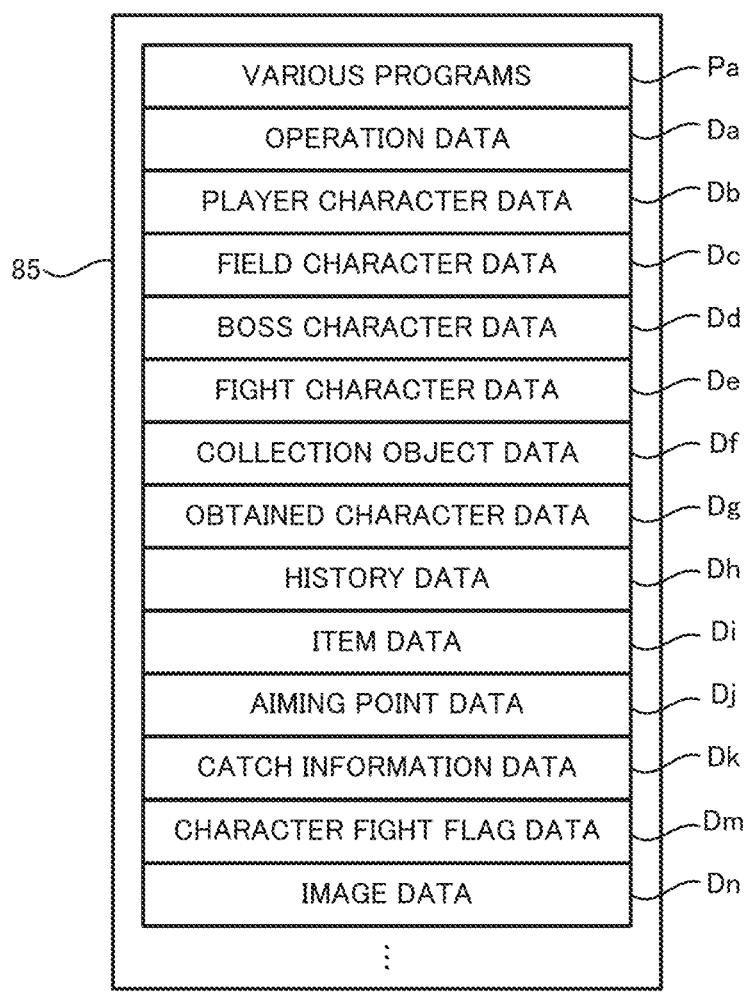
FIG. 21 is a diagram illustrating a non-limiting example of a data area set in a DRAM 85 of a main body apparatus 2 in the present non-limiting example.

Next, a non-limiting example of a specific process executed in the game system 1 in the first and second non-limiting embodiments will be described with reference to FIGS. 21 to 26. FIG. 21 is a diagram illustrating a non-limiting example of a data area set in the DRAM 85 of the main body apparatus 2 in the first and second non-limiting embodiments. It should be noted that in addition to the data illustrated in FIG. 21, the DRAM 85 may also store data used in other processes, and those data will not be described in detail.

Various programs Pa that are executed in the game system 1 are stored in a program storage area of the DRAM 85. In this non-limiting example, the programs Pa include an application program (e.g., a game program) for performing information processing based on data obtained from the left controller 3 and/or the right controller 4, and the main body apparatus 2. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

Various kinds of data that are used in processes such as an information process that are executed in the game system 1 are stored in a data storage area of the DRAM 85. In this non-limiting example, the DRAM 85 stores operation data Da, player character data Db, field character data Dc, boss character data Dd, fighting character data De, collection object data Df, obtained character data Dg, history data Dh, item data Di, aiming point data Dj, catch information data Dk, character fight flag data Dm, image data Dn, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, or a touch panel) (specifically, information about an operation). In this non-limiting example, operation data is obtained from each of the left controller 3 and/or the right controller 4 and the main body apparatus 2. The obtained operation data is used to update the operation data Da as appropriate. Note that the operation data Da may be updated for each frame that is the cycle of a process executed in the game system 1, or may be updated each time operation data is obtained.

The player character data Db indicates the place and position of the player character PC disposed in the virtual space, the movement and state in the virtual space of the player character PC, and the like.

The field character data Dc indicates the type, place, position, movement, and state of each field character FC disposed in the virtual space, and the like. The boss character data Dd indicates the type, place, position, movement, and state of the boss character MC disposed in the virtual space, and the like.

The fighting character data De indicates the type, place, position, movement, and state of a fighting character BC appearing in the virtual space, and the like.

The collection object data Df indicates the type, place, position, and state of each collection object OBJ disposed in the virtual space, and the like.

The obtained character data Dg indicates the types and number of field characters FC (fighting characters) obtained by the user by catching or the like, and the like.

The history data Dh indicates mission information about the history of missions in a game.

The item data Di indicates the types and number of items possessed by the player character PC, and the like.

The aiming point data Dj indicates the types and locations of aiming points that are a target for a projectile that is thrown by the player character PC.

The catch information data Dk relates to catch information indicating how likely the result of successful-catch determination is to be positive for a field character FC to which an aiming point is locked on.

The character fight flag data Dm indicates a character fight flag that is set on when a fight using a fighting character BC is allowed in the boss fight event.

The image data Dn is used to display, on a display screen (e.g., the display 12 of the main body apparatus 2), images (e.g., an image of the player character PC, an image of a field character FC, an image of the boss character MC, an image of a fighting character BC, an image of each item, an image of a collection object OBJ or other objects, an image of an aiming point, an image of the virtual space, and a background image).

Figure 22:
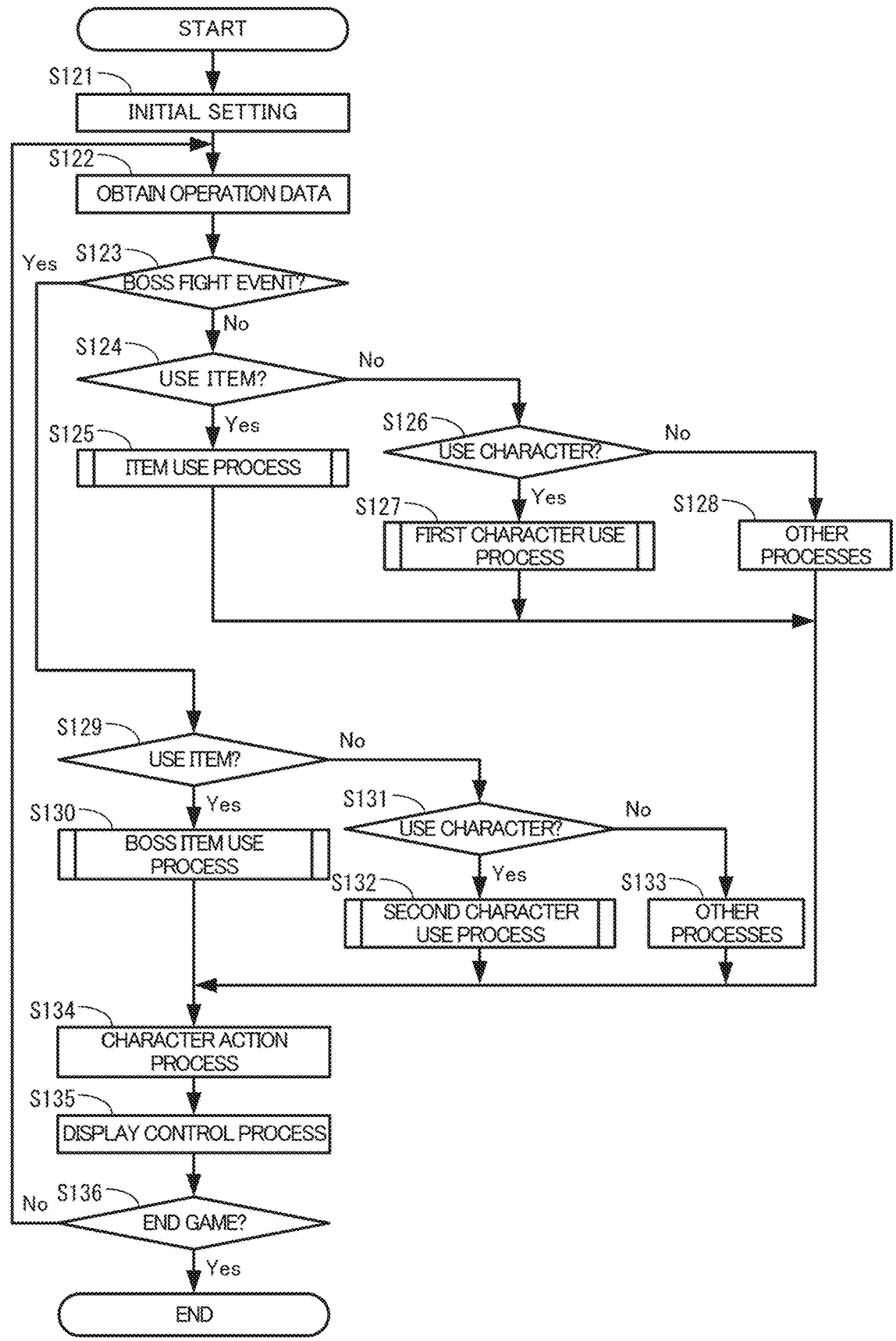
FIG. 22 is a flowchart illustrating a non-limiting example of a game process executed in a game system 1.
Figure 23:
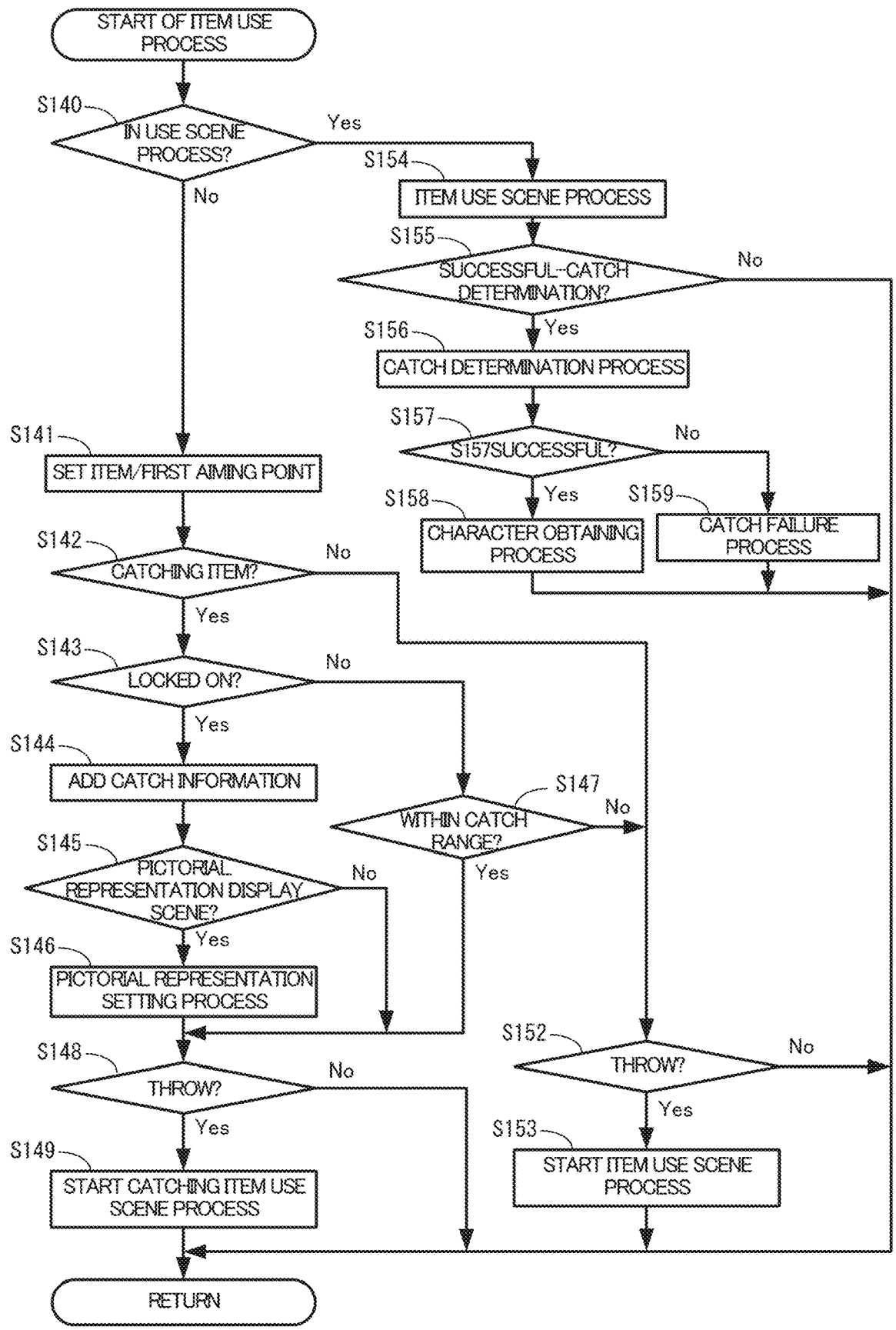
FIG. 23 is a subroutine illustrating a specific non-limiting example of an item use process executed in step S125 of FIG. 22.
Figure 24:
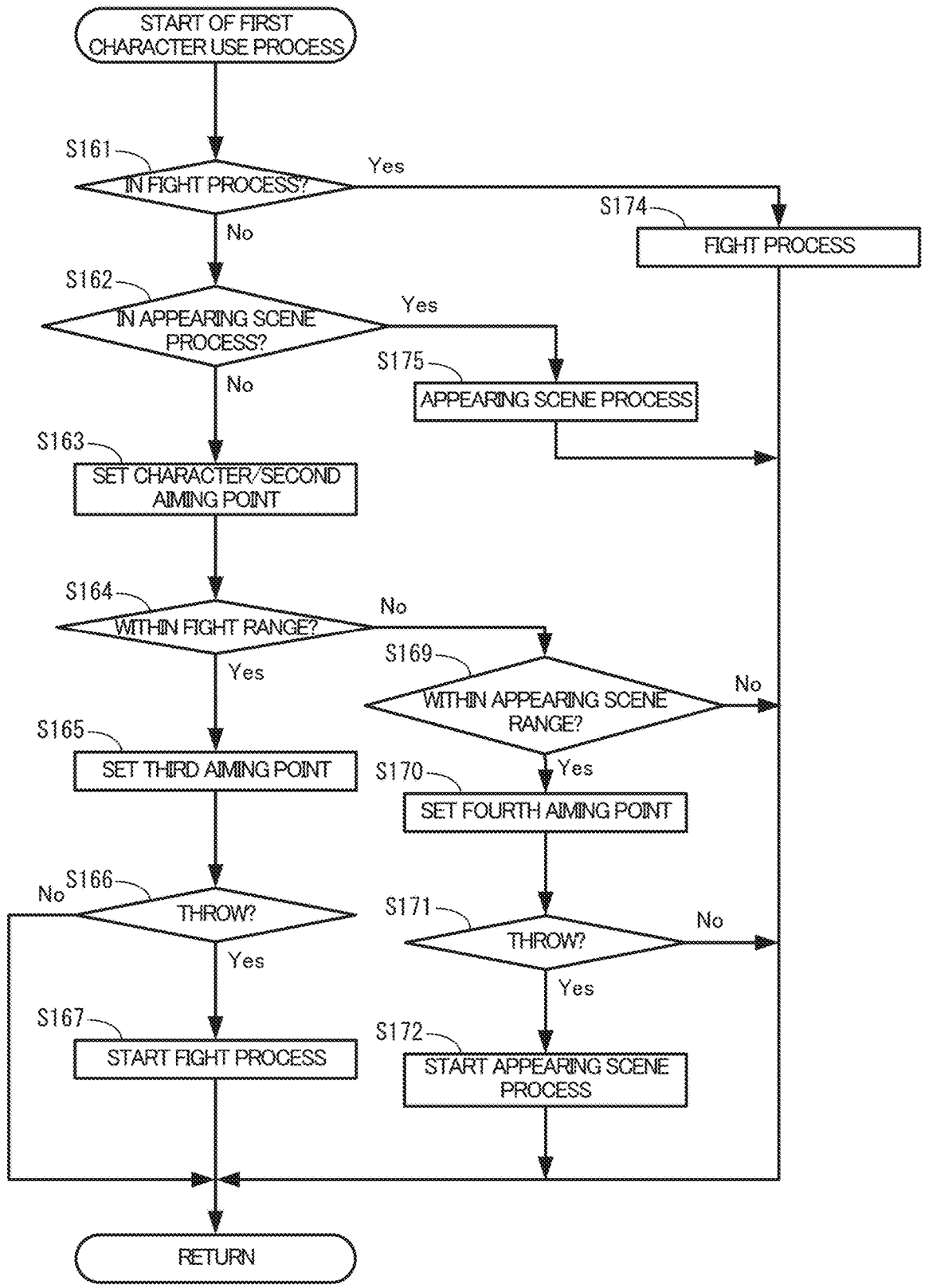
FIG. 24 is a subroutine illustrating a specific non-limiting example of a first character use process executed in step S127 of FIG. 22.
Figure 25:
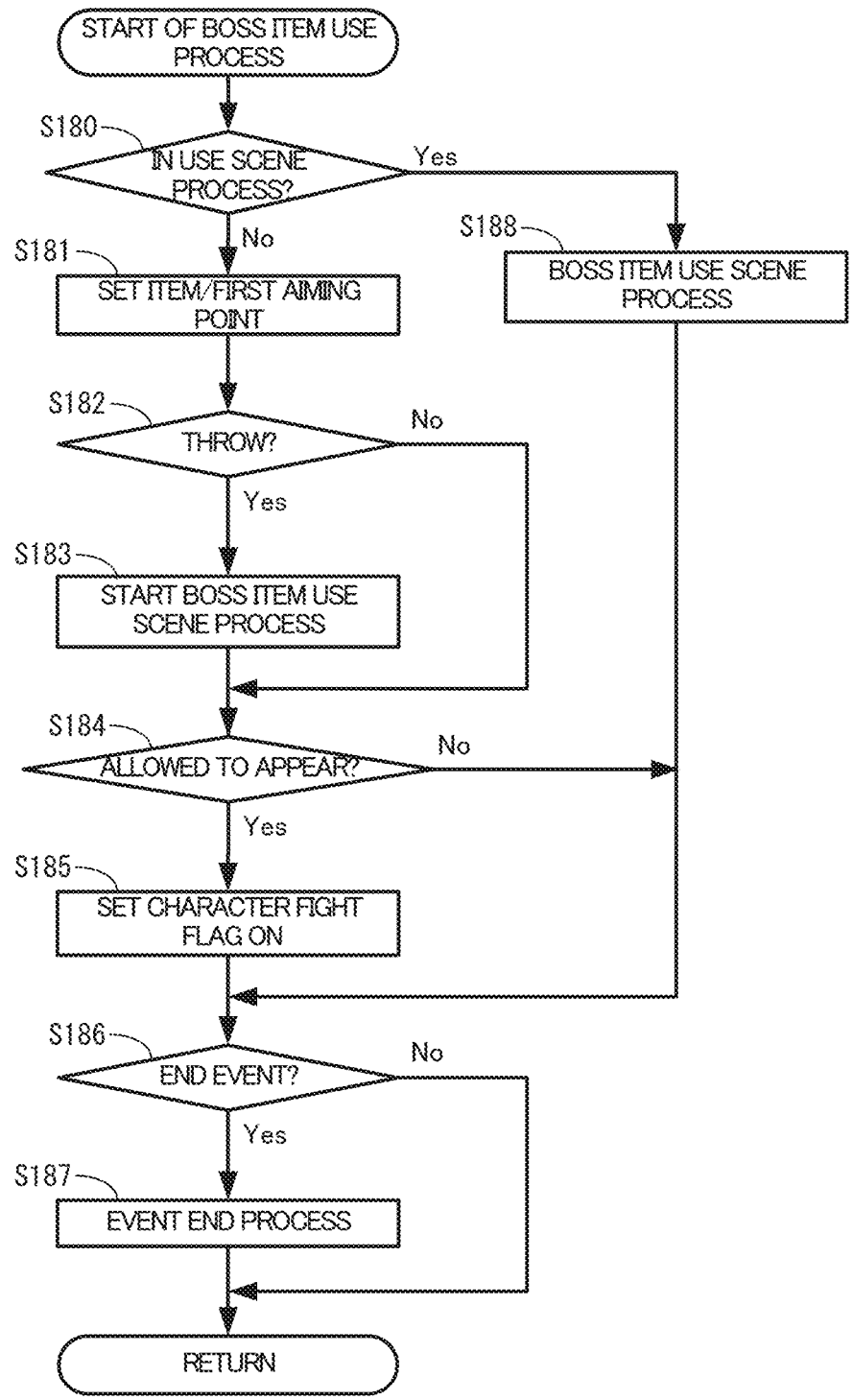
FIG. 25 is a subroutine illustrating a specific non-limiting example of a boss item use process executed in step S130 of FIG. 22.
Figure 26:
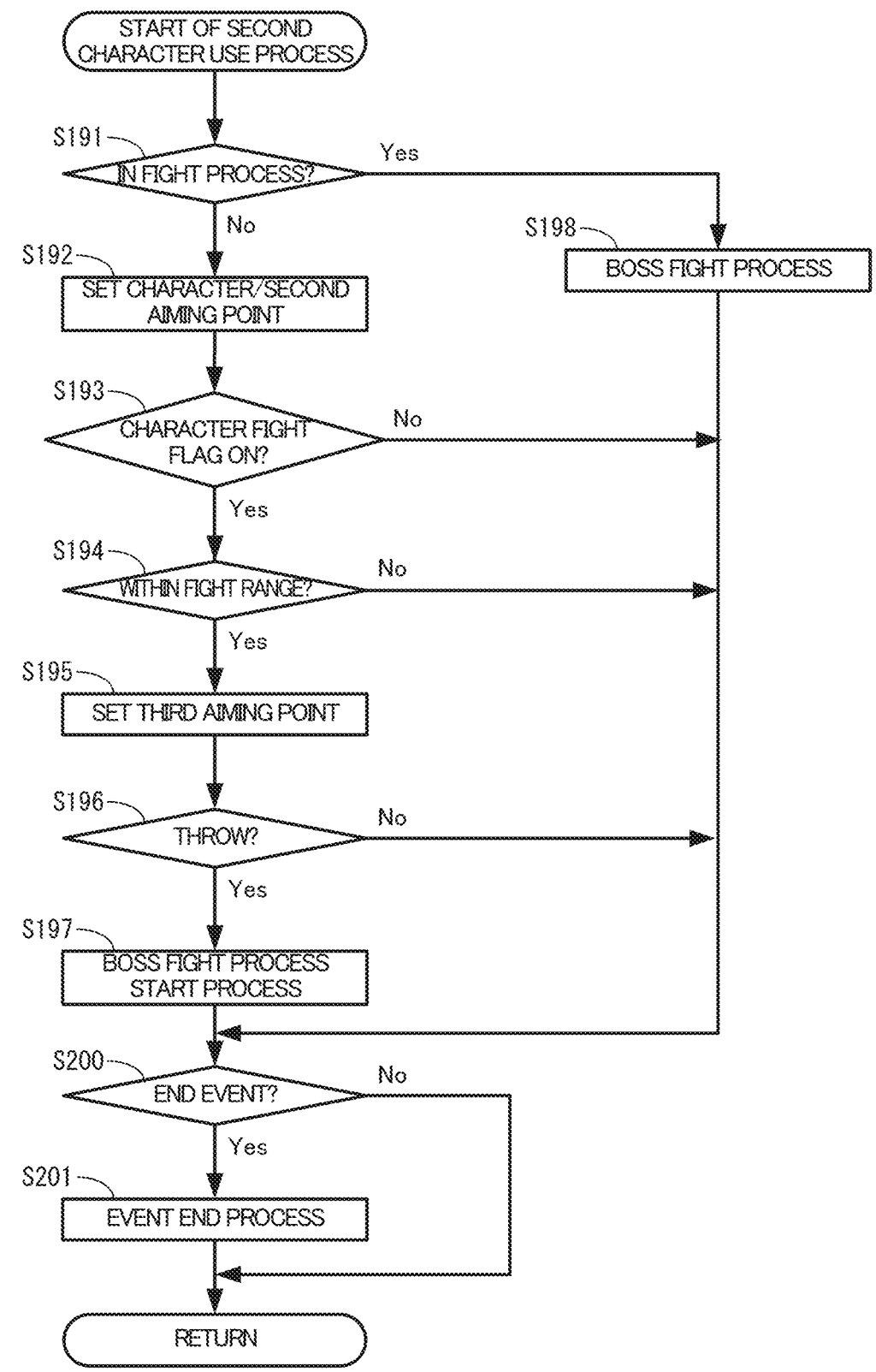
FIG. 26 is a subroutine illustrating a specific non-limiting example of a second character use process executed in step S132 of FIG. 22.

Next, a specific non-limiting example of a game process in the first and second non-limiting embodiments will be described with reference to FIGS. 22 to 26. FIG. 22 is a flowchart illustrating a non-limiting example of a game process executed in the game system 1. FIG. 23 is a subroutine illustrating a specific non-limiting example of an item use process executed in step S125 of FIG. 22. FIG. 24 is a subroutine illustrating a specific non-limiting example of a first character use process executed in step S127 of FIG. 22. FIG. 25 is a subroutine illustrating a specific non-limiting example of a boss item use process executed in step S130 of FIG. 22. FIG. 26 is a subroutine illustrating a specific non-limiting example of a second character use process executed in step S132 of FIG. 22. In the present non-limiting example, the processes of FIGS. 22 to 26 are executed by the processor 81 executing a predetermined application program (game program) included the programs Pa. The processes of FIGS. 22 to 26 are started with any appropriate timing.

It should be noted that steps in the flowcharts of FIGS. 22 to 26, which are merely illustrative, may be executed in a different order, or another step may be executed in addition to (or instead of) each step, if a similar effect is obtained. In this non-limiting example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 22 to 26 may be executed by a plurality of information processing apparatuses including the main body apparatus 2 cooperating with each other.

In FIG. 22, the processor 81 performs initial setting for the game process (step S121), and proceeds to the next step. For example, in the initial setting, the processor 81 initializes parameters for performing processes described below.

Next, the processor 81 obtains operation data from the left controller 3, the right controller 4, and/or the main body apparatus 2, and updates the operation data Da (step S122), and proceeds to the next step.

Next, the processor 81 determines whether or not the boss fight event is being carried out (step S123). For example, if the operation data Da does not indicate an instruction to start the boss fight event, and the boss fight event is not being currently carried out, the processor 81 proceeds to step S124, assuming that the current situation is a normal situation on the field. It should be noted that a game situation that is neither in the boss fight event nor in a normal situation on the field will not be described. Otherwise, if the operation data Da indicates an instruction to start the boss fight event, or the boss fight event is being currently carried out, the processor 81 proceeds to step S129.

In step S124, the processor 81 determines, based on the operation data Da, whether or not an item is to be used in the current situation. If the operation data Da indicates an instruction to use an item or the current situation is in a scene in which an item is used, the processor 81 proceeds to step S125. Otherwise, if the operation data Da does not indicate an instruction to use an item and the current situation is not in a scene in which an item is used, the processor 81 proceeds to step S126. As a non-limiting example, if an operation input for causing the player character PC to perform an action of getting into a throwing position for throwing an item (e.g., pressing the operation button (ZR button) 61) has been performed, and the first category (first mode) has been chosen as a projectile according to a predetermined operation input (e.g., pressing down the operation button (X button) 55), the processor 81 determines that the user's operation indicates an instruction to use an item. It should be noted that even if the current situation is in a scene in which an item is used, then when the operation data Da indicates an instruction to use a fighting character, the result of the determination by the processor 81 in step S124 is negative.

In step S125, the processor 81 executes the item use process, and proceeds to step S134. The item use process of step S125 will be described below with reference to FIG. 23.

In FIG. 23, the processor 81 determines whether or not an item use scene process is being currently executed (step S140). For example, if a catching item use scene process or an item use scene process has been started in step S149 or S153 described below, the result of the determination by the processor 81 in step S140 is positive. If the item use scene process is not being currently executed, the processor 81 proceeds to step S141. Otherwise, if the item use scene process is being currently executed, the processor 81 proceeds to step S154.

In step S141, the processor 81 sets an item to be thrown by the player character PC, sets the first aiming point M1, and proceeds to the next step. For example, the processor 81 looks up the operation data Da and the item data Di, chooses and sets an item to be thrown from the items possessed by the player character PC according to an operation input for choosing an item (e.g., an operation input for pressing down the operation button (L button) 38 or the operation button (R button) 60), and sets the projectile information Im1 (see FIGS. 8 and 9). The processor 81 also looks up the operation data Da, sets the aiming point to the first aiming point M1 (see FIG. 8), sets the location of the aiming point according to an operation input for moving the aiming point (e.g., the direction of inclination of the analog stick 32 or 52), and updates the aiming point data Dj.

Next, the processor 81 determines whether or not the item set in step S141 is a catching item (e.g., an empty ball item B) (step S142). If the item set in step S141 is a catching item, the processor 81 proceeds to step S143. Otherwise, if the item set in step S141 is not a catching item, the processor 81 proceeds to step S152.

In step S143, the processor 81 determines whether or not an aiming point is locked on to a field character FC. For example, if the operation data Da indicates that an operation input for locking the aiming point on to a field character FC (e.g., an operation input of pressing down the operation button (ZL button) 39) has been performed, the result of the determination by the processor 81 in step S143 is positive. If an aiming point is locked on to a field character FC, the processor 81 proceeds to step S144. Otherwise, if the aiming point is not locked on to a field character FC, the processor 81 proceeds to step S147.

In step S144, the processor 81 sets the first aiming point M1 at a lock-on location, adds the catch information Ig to the first aiming point M1, and proceeds to the next step. For example, the processor 81 extracts, as a target to which the aiming point is to be locked on, a field character FC that is located closest to the player character PC in front of the player character PC, based on the field character data Dc. Thereafter, the processor 81 sets the locked-on first aiming point M1 at a location (e.g., a center-of-gravity location) where the first aiming point M1 overlays the field character FC extracted as a target to which the aiming point is to be locked on, and updates the aiming point data Dj. The processor 81 also calculates, based on the type and state of the field character FC extracted as a target to which the aiming point is to be locked on, a probability that the result of successful-catch determination about the field character FC would be positive, sets the catch information Ig corresponding to the result of the calculation at a location where the catch information Ig is added to the first aiming point M1, and updates the catch information data Dk.

Next, the processor 81 determines whether or not the pictorial representation is to be displayed (step S145). For example, if the operation data Da indicates an instruction to display the pictorial representation (e.g., an operation instruction to press down the operation button (down button) 34) or the pictorial representation is being currently displayed, the processor 81 proceeds to step S146. Otherwise, if the operation data Da does not indicate an instruction to display the pictorial representation and the pictorial representation is not being currently displayed, the processor 81 proceeds to step S148.

In step S146, the processor 81 executes a pictorial representation image setting process, and proceeds to step S148. For example, the processor 81 extracts, from the history data Dh, mission information about the history of missions in a game such as the number of caught field characters FC to which an aiming point is locked on, the number of times of a fight, and the like. Thereafter, based on the extracted mission information, the processor 81 sets a pictorial representation image of a field character FC to which an aiming point is locked on (see FIG. 17).

In step S147, the processor 81 determines whether or not the first aiming point M1 is disposed, overlaying the catch range of a field character FC (step S147). For example, if the aiming point data Dj and the field character data De indicate that the first aiming point M1 is disposed, overlaying a range in which a field character in the field character data Dc that is disposed on the field can be caught, the result of the determination in step S147 is positive. If the first aiming point M1 is disposed, overlaying the catch range of a field character FC, the processor 81 proceeds to step S148. Otherwise, if the first aiming point M1 does not overlay the catch range of a field character FC, the processor 81 proceeds to step S152.

In step S148, the processor 81 determines whether or not the item is to be thrown. For example, if the operation data Da indicates that an operation of causing the player character to throw an item (e.g., an operation of ending an operation of causing the player character to get into a throwing position, and as a non-limiting example, an operation of releasing the operation button (ZR button) 61) has been performed, the result of the determination by the processor 81 in step S148 is positive. If the processor 81 determines that the item is to be thrown, the processor 81 proceeds to step S149. Otherwise, if the processor 81 does not determine that the item is to be thrown, the processor 81 ends the subroutine.

In step S149, the processor 81 starts the catching item use scene process of causing the player character PC to throw the catching item, and ends the subroutine. It should be noted that the processor 81 updates the aiming point data Dj such that the displayed first aiming point M1 is removed during the start of the catching item use scene process.

In step S152, the processor 81 determines whether or not the chosen item is to be thrown as a projectile. For example, if the operation data Da indicates that an operation of causing the player character PC to throw an item (e.g., an operation of ending an operation of causing the player character PC to get into a throwing position, and as a non-limiting example, an operation of releasing the operation button (ZR button) 61) has been performed, the result of the determination by the processor 81 in step S152 is positive. If the processor 81 determines that the item is to be thrown, the processor 81 proceeds to step S153. Otherwise, if the processor 81 does not determine that the item is to be thrown, the processor 81 ends the subroutine.

In step S153, the processor 81 starts the item use scene process of causing the player character PC to throw the catching item or an item other than catching items, and ends the subroutine. It should be noted that the processor 81 updates the aiming point data Dj (and the catch information data Dk) so as to remove the displayed first aiming point M1 (and the catch information Ig) during the start of the item use scene process.

If in step S140, the processor 81 determines that the item use scene process is being currently executed, the processor 81 executes the item use scene process (step S154), and proceeds to the next step. For example, in the item use scene process, the processor 81 sets the player character PC's action of throwing an item (a catching item or an item other than catching items) chosen as a projectile, at the location in the virtual space indicated by the first aiming point M1, and also sets a movement of the thrown item in the virtual space.

In the item use scene process, after the end of the scene that the item is thrown, the processor 81 sets the effect of the item at a location where the item has reached. For example, the processor 81 determines what kind of effect is exhibited by throwing the item, based on the type of the item, the location where the thrown item has reached, the state of a target at which the item has been thrown, and the like. Thereafter, based on the determined effect of the item, the processor 81 changes the target in the virtual space at which the item has been thrown. As a non-limiting example, when an item that changes the state of a field character FC is thrown, the state of the field character FC is changed based on the determined effect of the item, and the field character data De is updated for the field character FC.

It should be noted that the item effect determination may indicate that no effect has been obtained by throwing an item. As a non-limiting example, when a thrown catching item deviates from the range in which a field character FC can be caught, the item may fall or disappear in the virtual space without affecting the field character FC. If no effect is obtained by throwing an item, the item may be forbidden to be thrown. As a non-limiting example, if no effect is obtained by throwing an item, then even when the user performs an operation input for causing the player character PC to perform an action of throwing the item, the player character PC may be maintained in the throwing position without start of a scene that the item is thrown.

In the item use scene process, the processor 81, when ending the item use scene process, also ends the item use process in which the subroutine is used. The processor 81 ends the item use scene process, for example, if a condition for ending the item use scene process is satisfied (e.g., the exhibition of the effect of the item on an object or a character in the virtual space is ended), the user has performed an operation of ending the item use scene process, or the like.

Next, the processor 81 determines whether or not to execute a catch determination process (step S155). For example, if it is time to perform catch determination after the end of the movement of the thrown catching item in the virtual space, the result of the determination by the processor 81 in step S155 is positive. If the processor 81 determines to execute the catch determination process, the processor 81 proceeds to step S156. Otherwise, if it is not time to execute the catch determination process or an item other than catching items has been thrown, the processor 81 ends the subroutine.

In step S156, the processor 81 executes the catch determination process, and proceeds to the next step. For example, the processor 81 determines whether or not a field character FC is successfully caught, based on the type of the thrown catching item, whether or not the thrown catching item has hit the field character FC, the state of the field character FC, and the like.

Next, in the catch determination process of step S156, the processor 81 determines whether or not a field character FC is successfully caught (step S157). If a field character FC is successfully caught, the processor 81 proceeds to step S158. Otherwise, if a field character FC is not successfully caught, the processor 81 proceeds to step S159.

In step S158, the processor 81 sets a successful catch scene, sets a field character FC successfully caught in the user's possession, and ends the subroutine. For example, the processor 81 sets a successful catch scene indicating that a field character FC is put into an empty ball item B so that the field character FC is caught (see FIGS. 9 and 10), ends the item use scene process, and ends the item use process in which the subroutine is used. The processor 81 also updates the obtained character data Dg such that the successfully caught field character FC is in the user's possession.

In step S159, the processor 81 sets an unsuccessful catch scene, and ends the subroutine. For example, the processor 81 sets an unsuccessful catch scene indicating that a field character FC is not put into an empty ball item B, ends the item use scene process, and ends the item use process in which the subroutine is used.

Referring back to FIG. 22, if in step S124, the processor 81 determines that an item is not to be used in the current situation, the processor 81 determines, based on the operation data Da, whether or not a fighting character is to be used in the current situation (step S126). If the operation data Da indicates an instruction to use a fighting character or a fighting character is being used in the current scene, the processor 81 proceeds to step S127. Otherwise, if the operation data Da does not indicate an instruction to use a fighting character and a fighting character is not being used in the current scene, the processor 81 proceeds to step S128. As a non-limiting example, if an operation input for causing the player character PC to get into a throwing position for throwing a fighting character (e.g., pressing down the operation button (ZR button) 61) has been performed, and the second category (second mode) has been chosen as a projectile according to a predetermined operation input (e.g., pressing down the operation button (X button) 55), the processor 81 determines that the user's operation indicates an instruction to use a fighting character.

In step S127, the processor 81 executes a first character use process, and proceeds to step S134. The first character use process of step S127 will be described below with reference to FIG. 24.

In FIG. 24, the processor 81 determines whether or not a fight process is being currently executed for a fighting character (step S161). For example, if a fight process of causing a fighting character and a field character to fight against each other has been started in step S167 described below, the result of the determination by the processor 81 in step S161 is positive. If the fight process is not being currently executed for a fighting character, the processor 81 proceeds to step S162. Otherwise, if the fight process is being currently executed for a fighting character, the processor 81 proceeds to step S174.

In step S162, the processor 81 determines whether or not a fighting character appearing scene process is being currently executed. For example, if the fighting character appearing scene process has been started in step S172 described below, the result of the determination by the processor 81 in step S162 is positive. If the fighting character appearing scene process is not being currently executed, the processor 81 proceeds to step S163. Otherwise, if the fighting character appearing scene process is being currently executed, the processor 81 proceeds to step S175.

In step S163, the processor 81 sets a fighting character that is to be thrown by the player character PC, sets the second aiming point M2, and proceeds to the next step. For example, the processor 81 looks up the operation data Da and the obtained character data Dg, chooses and sets a fighting character BC that is to be thrown, from characters possessed by the player character PC, according to an operation input of choosing a fighting character (e.g., an operation input of pressing down the operation button (L button) 38 or the operation button (R button) 60), and sets the projectile information Im2 (see FIGS. 11 to 16). The processor 81 also looks up the operation data Da, sets the aiming point type to the second aiming point M2 (see FIG. 11), sets the location of the aiming point according to an operation input for moving the aiming point (e.g., the direction of inclination of the analog stick 32 or 52), and updates the aiming point data Dj.

Next, the processor 81 determines whether or not the second aiming point M2 is disposed, overlaying a fight range in which a fight is allowed against a field character FC (step S164). For example, if the processor 81 determines, based on the aiming point data Dj and the field character data Dc, that the second aiming point M2 is displayed, overlaying a fight range in which a fight is allowed against a field character FC in the field character data DC disposed on the field, the result of the determination by the processor 81 in step S164 is positive. If the second aiming point M2 is disposed, overlaying the fight range, the processor 81 proceeds to step S165. Otherwise, if the second aiming point M2 does not overlay the fight range, the processor 81 proceeds to step S169.

In step S165, the processor 81 changes the second aiming point M2 to the third aiming point M3, and proceeds to the next step. For example, the processor 81 changes and sets the aiming point type to the third aiming point M3 (see FIG. 12), and updates the aiming point data Dj.

Next, the processor 81 determines whether or not a fighting character is to be thrown (step S166). For example, if the processor 81 determines, based on the operation data Da, that an operation of causing the player character PC to perform an action of throwing a fighting character (ball item Bs) (e.g., an operation of ending an operation for causing the player character PC to get into a throwing position, and as a non-limiting example, an operation of releasing the operation button (ZR button) 61) has been performed, the result of the determination by the processor 81 in step S166 is positive. If the processor 81 determines that a fighting character is to be thrown, the processor 81 proceeds to step S167. Otherwise, if the processor 81 does not determine that a fighting character is to be thrown, the processor 81 ends the subroutine.

In step S167, the processor 81 starts a fight process of causing a fighting character to fight against a field character, and ends the subroutine. It should be noted that the processor 81 updates the aiming point data Dj such that the displayed third aiming point M3 is removed during the start of the fight process.

In step S169, the processor 81 determines whether or not the second aiming point M2 is disposed, overlaying an appearing scene range in which a fighting character can appear and perform an action other than the fight in the virtual space. For example, if the processor 81 determines, based on the aiming point data Dj and the collection object data Df, that the second aiming point M2 is disposed, overlaying a range in which an operation of collecting one of collection objects OBJ (see FIGS. 15 and 16) disposed on the field (appearing scene) can be performed, the result of the determination by the processor 81 in step S169 is positive. If the second aiming point M2 is disposed, overlaying the appearing scene range, the processor 81 proceeds to step S170. Otherwise, if the second aiming point M2 does not overlay the appearing scene range, the processor 81 ends the subroutine.

In step S170, the processor 81 changes the second aiming point M2 to the fourth aiming point M4, and proceeds to the next step. For example, the processor 81 changes the aiming point type to the fourth aiming point M4 (see FIG. 15), and updates the aiming point data Dj.

Next, the processor 81 determines whether or not a fighting character is to be thrown (step S171). For example, if the processor 81 determines, based on the operation data Da, that an operation of causing the player character PC to perform an action of throwing a fighting character (ball item Bs) (e.g., an operation of ending an operation for causing the player character PC to get into a throwing position, and as a non-limiting example, an operation of releasing the operation button (ZR button) 61) has been performed, the result of the determination by the processor 81 in step S171 is positive. If the processor 81 determines that a fighting character is to be thrown, the processor 81 proceeds to step S172. Otherwise, if the processor 81 does not determine that a fighting character is to be thrown, the processor 81 ends the subroutine.

In step S167, the processor 81 starts executing an appearing scene process of causing a fighting character to appear in the virtual space and perform an action other than the fight, and ends the subroutine. It should be noted that the processor 81 updates the aiming point data Dj such that the displayed fourth aiming point M4 is removed during the start of the appearing scene process.

It should be noted that when an operation input for causing the player character PC to perform an action of throwing a fighting character with an aiming point (specifically, the second aiming point 2) displayed out of the fight range and the appearing scene range is performed, a ball item Bs may fall or disappear in the virtual space without a fighting character BC appearing, as a non-limiting example. As another non-limiting example, a ball item Bs containing a fighting character BC may be forbidden to be thrown. In that case, even when the user performs an operation input for causing the player character PC to perform an action of throwing a ball item Bs, the first character use process may be continued with the player character PC maintained in the throwing position without the start of a scene that the player character throws a ball item Bs. Alternatively, the first character use process may be temporarily ended without the start of a scene that the player character throws a ball item Bs.

If in step S161, the processor 81 determines that a fight process is being currently executed, the processor 81 executes the fight process (step S174), and ends the subroutine. For example, in the fight process, the processor 81 sets the player character PC's action of throwing a ball item Bs containing a fighting character BC chosen as a projectile, at a location in the virtual space indicated by the third aiming point M3, sets a movement of the thrown ball item Bs in the virtual space, and sets a series of scenes that the fighting character BC appears from a location in the virtual space that the ball item Bs has reached. After displaying the series of scenes, the processor 81 causes the appearing fighting character BC to fight against a field character FC.

In the fight process, the processor 81 changes the states of the fighting character BC and the field character FC, depending on the fight against the fighting character BC, and causes a character whose state has been reduced to a predetermined threshold to lose the fight. In the fight process, the processor 81 sets the actions of the fighting character BC and/or the player character PC according to an operation input of choosing a command to control the actions of the fighting character BC and/or the player character PC. For example, if the operation data Da indicates an operation input chosen from a plurality of attack commands, the processor 81 controls the fighting character BC such that the fighting character BC performs an attack action corresponding to the attack command. If the operation data Da indicates an operation input of choosing a command to use a catching item for catching a field character FC during a fight, the processor 81 causes the player character PC to perform an action of catching the field character FC using the catching item. Thereafter, the processor 81 performs the successful-catch determination on the field character FC based on the state of the field character FC. If the result of the successful-catch determination is positive, the processor 81 sets a scene that the field character FC is caught, and sets the field character FC in the user's possession.

In the fight process of step S161, the processor 81, when ending the fight process, also ends the first character use process in which the subroutine is used. The processor 81 ends the fight process, for example, if a condition for ending the fight process is satisfied (e.g., a field character against which a fighting character BC fights has been caught, or a fighting character BC has won/lost a fight), the user has performed an operation of ending the fight process, or the like.

If in step S162, the processor 81 determines that an appearing scene process is being currently executed, the processor 81 executes the appearing scene process (step S175), and ends the subroutine. For example, in the appearing scene process, the processor 81 sets the player character PC's action of throwing a ball item Bs containing a fighting character BC chosen as a projectile, at a location in the virtual space indicated by the fourth aiming point M4, sets a movement of the thrown ball item Bs in the virtual space, and sets a series of scenes that the fighting character BC appears from a location in the virtual space that the ball item Bs has reached. After displaying the series of scenes, the processor 81 executes an appearing scene process of causing the appearing fighting character BC to perform a predetermined action (e.g., an action of collecting a collection object OBJ).

In the appearing scene process, the processor 81, when ending the appearing scene process, also ends the first character use process in which the subroutine is used. The processor 81 ends the appearing scene process, for example, if a condition for ending the appearing scene process is satisfied (e.g., the predetermined action of a fighting character BC is ended), the user has performed an operation of ending the appearing scene process, or the like.

Referring back to FIG. 22, if in step S126, the processor 81 determines that a fighting character is not to be used in the current situation, the processor 81 executes other processes based on the operation data Da (step S128), and proceeds to step S134. As a non-limiting example of the other processes, the processor 81 changes the place and position of the player character PC in the virtual space according to an operation input of moving the player character PC that is indicated by the operation data Da, and updates the player character data Db.

If in step S123, if the processor 81 determines that a boss fight event is being currently carried out, the processor 81 determines, based on the operation data Da, whether or not a boss item is to be used in the boss fight event (step S129). If the operation data Da indicates an instruction to use a boss item or a boss item is being used in the current scene, the processor 81 proceeds to step S130. Otherwise, if the operation data Da does not indicate an instruction to use a boss item and a boss item is not being used in the current scene, the processor 81 proceeds to step S131. As a non-limiting example, if an operation input of causing the player character PC to get into a throwing position for throwing a boss item (e.g., pressing down the operation button (ZR button) 61) has been performed, and the first category (first mode) has been chosen as a projectile by a predetermined operation input (e.g., pressing down the operation button (X button) 55), the processor 81 determines that the user's operation indicates an instruction to use a boss item. It should be noted that even in a scene in which a boss item is used, if the operation data Da indicates an instruction to use a fighting character, the result of the determination by the processor 81 in step S129 is negative.

In step S130, the processor 81 executes a boss item use process, and proceeds to step S134. The boss item use process of step S130 will be described below with reference to FIG. 25.

In FIG. 25, the processor 81 determines whether or not a boss item use scene process is being currently executed (step S180). For example, if the boss item use scene process has been started in step S183 described below, the result of the determination by the processor 81 in step S180 is positive. If the boss item use scene process is not being currently executed, the processor 81 proceeds to step S181. Otherwise, if the boss item use scene process is being currently executed, the processor 81 proceeds to step S188.

In step S181, the processor 81 sets a boss item that is to be thrown by the player character PC, sets the first aiming point M1, and proceeds to the next step. For example, the processor 81 looks up the operation data Da and the item data Di, chooses and sets a boss item that is to be thrown, from items possessed by the player character PC, according to an operation input of choosing a boss item (e.g., an operation input of pressing down the operation button (L button) 38 or the operation button (R button) 60), and sets the projectile information Im3 (see FIG. 18). The processor 81 also looks up the operation data Da, sets the aiming point type to the first aiming point M1 (see FIG. 18), sets the location of the aiming point according to an operation input for moving the aiming point (e.g., the direction of inclination of the analog stick 32 or 52), and updates the aiming point data Dj.

Next, the processor 81 determines whether or not the boss item is to be thrown (step S182). For example, if the processor 81 determines, based on the operation data Da, that an operation of causing the player character PC to perform an action of throwing the boss item (e.g., an operation of ending an operation for causing the player character PC to get into a throwing position, and as a non-limiting example, an operation of releasing the operation button (ZR button) 61) has been performed, the result of the determination by the processor 81 in step S182 is positive. If the processor 81 determines that the boss item is to be thrown, the processor 81 proceeds to step S183. Otherwise, if the processor 81 does not determine that the boss item is to be thrown, the processor 81 proceeds to step S184.

In step S183, the processor 81 starts a boss item use scene process of causing the player character PC to throw the boss item, and proceeds to step S184.

In step S184, the processor 81 determines whether or not a fighting character BC can appear so as to fight against the boss character MC in the current situation. For example, if the boss character MC is in a predetermined state, the result of the determination by the processor 81 in step S184 is positive. If a fighting character BC can appear in the current situation, the processor 81 proceeds to step S185. Otherwise, if a fighting character BC cannot appear in the current situation, the processor 81 proceeds to step S186.

In step S185, the processor 81 sets the character fight flag on, updates the character fight flag data Dm, and proceeds to step S186.

In step S186, the processor 81 determines whether or not to end the boss fight event. The boss fight event is ended, for example, if a condition for ending the boss fight event is satisfied (e.g., a boss state parameter (see the gauge G2 of FIG. 18) has reached a threshold, the boss character MC has won/lost a fight against the player character PC in the event, or the event period has expired), the user has performed an operation of ending the boss fight event, or the like. If the processor 81 determines to end the boss fight event, the processor 81 proceeds to step S187. Otherwise, if the processor 81 does not determine to end the boss fight event, the processor 81 ends the subroutine.

In step S187, the processor 81 executes a boss fight event end process, and ends the subroutine. For example, the processor 81 executes the boss fight event end process by ending the boss item use process, and setting a scene that the boss character MC has won/lost a fight against the player character PC, or the like.

If in step S180, the processor determines that the boss item use scene process is being currently executed, the processor 81 executes the boss item use scene process (step S188), and proceeds to step S186. For example, in the boss item use scene process, the processor 81 sets the player character PC's action of throwing a boss item chosen as a projectile at a location in the virtual space indicated by the first aiming point M1, and sets a movement action of the thrown boss item in the virtual space.

In the boss item use scene process, after the end of the scene that the boss item is thrown, the processor 81 sets the effect of the boss item at a location where the boss item has reached. For example, the processor 81 determines what kind of effect is exhibited by throwing the boss item, based on the type of the boss item, the location where the thrown boss item has reached, the site of the boss character MC that the thrown boss item has hit, the state of the boss character MC at which the boss item has been thrown, and the like. Thereafter, based on the determined effect of the boss item, the processor 81 changes the boss character MC or the target in the virtual space at which the item has been thrown. As a non-limiting example, when the boss item hits the boss character MC, the processor 81 changes a state (e.g., the boss state parameter) of the boss character MC based on the determined effect of the boss item, and updates the boss character data Dd.

It should be noted that in the boss item use scene process, the processor 81, when ending the boss item use scene process, updates the aiming point data Dj such that the displayed first aiming point M1 is removed, and ends the boss item use process in which the subroutine is used. The processor 81 ends the boss item use scene process, for example, if a condition for ending the boss item use scene process is satisfied (e.g., the exhibition of the effect of the boss item on the boss character MC in the virtual space is ended), the user has performed an operation of ending the boss item use scene process, or the like.

Referring back to FIG. 22, if in step S129, the processor 81 determines that a boss item is not to be used in the current situation, the processor 81 determines, based on the operation data Da, whether or not a fighting character is to be used in the current situation (step S131). If the operation data Da indicates an instruction to use a fighting character or that a fighting character is being used in the current scene, the processor 81 proceeds to step S132. Otherwise, if the operation data Da does not indicate an instruction to use a fighting character and a fighting character is not being used in the current scene, the processor 81 proceeds to step S133. As a non-limiting example, if an operation input for causing the player character PC to get into a throwing position for throwing a fighting character (e.g., pressing down the operation button (ZR button) 61) has been performed, and the second category (second mode) has been chosen as a projectile according to a predetermined operation input (e.g., pressing down the operation button (X button) 55), the processor 81 determines that the user's operation indicates an instruction to use a fighting character.

In step S132, the processor 81 executes a second character use process, and proceeds to step S134. The second character use process of step S132 will be described below with reference to FIG. 26.

In FIG. 26, the processor 81 determines whether or not a fight process between a fighting character and a boss character is being currently executed (step S191). For example, if a boss fight process of causing a fighting character and a boss character to fight against each other has been started in step S197 described below, the result of the determination by the processor 81 in step S191 is positive. If a fight process between a fighting character and a boss character is not being currently executed, the processor 81 proceeds to step S192. Otherwise, if a fight process between a fighting character and a boss character is being currently executed, the processor 81 proceeds to step S198.

In step S192, the processor 81 sets a fighting character that is to be thrown by the player character PC, sets the second aiming point M2, and proceeds to the next step. For example, the processor 81 looks up the operation data Da and the obtained character data Dg, chooses and sets a fighting character BC that is to be thrown, from characters possessed by the player character PC, according to an operation input of choosing a fighting character (e.g., an operation input of pressing down the operation button (L button) 38 or the operation button (R button) 60), and sets the projectile information Im2 (see FIGS. 19 and 20). The processor 81 also looks up the operation data Da, sets the aiming point type to the second aiming point M2, sets the location of the aiming point according to an operation input for moving the aiming point (e.g., the direction of inclination of the analog stick 32 or 52), and updates the aiming point data Dj.

Next, the processor 81 looks up the character fight flag data Dm, and determines whether or not the character fight flag is on (step S193). If the character fight flag is on, the processor 81 proceeds to step S194. Otherwise, if the character fight flag is off, the processor 81 proceeds to step S200.

In step S194, the processor 81 determines whether or not the second aiming point M2 is disposed, overlaying a fight range in which a fight is allowed between the boss character MC and a fighting character BC. For example, if the processor 81 determines, based on the aiming point data Dj and the boss character data Dd, that the second aiming point M2 is displayed, overlaying a fight range in which a fight is allowed against the boss character MC, which is disposed on the field, the result of the determination by the processor 81 in step S194 is positive. If the second aiming point M2 is disposed, overlaying the fight range, the processor 81 proceeds to step S195. Otherwise, if the second aiming point M2 does not overlay the fight range, the processor 81 proceeds to step S200.

In step S194, the processor 81 changes the second aiming point M2 to the third aiming point M3, and proceeds to the next step. For example, the processor 81 changes the aiming point type to the third aiming point M3 (see FIG. 19), and updates the aiming point data Dj.

Next, the processor 81 determines whether or not a fighting character is to be thrown (step S196). For example, if the processor 81 determines, based on the operation data Da, that an operation of causing the player character PC to perform an action of throwing a fighting character (ball item Bs) (e.g., an operation of ending an operation for causing the player character PC to get into a throwing position, and as a non-limiting example, an operation of releasing the operation button (ZR button) 61) has been performed, the result of the determination by the processor 81 in step S196 is positive. If the processor 81 determines that the fighting character is to be thrown, the processor 81 proceeds to step S197. Otherwise, if the processor 81 does not determine that the fighting character is to be thrown, the processor 81 ends the subroutine.

In step S197, the processor 81 starts a fight process of causing the fighting character to fight against the boss character, and proceeds to step S200. It should be noted that the processor 81 updates the aiming point data Dj such that the displayed third aiming point M3 is removed during the start of the boss fight process.

It should be noted that in the present non-limiting example, the fight range in which a fight is allowed between the boss character MC and a fighting character BC may not be set. In that case, the second aiming point M2 is changed to the third aiming point M3 irrespective of where the second aiming point M2 is disposed. In addition, after that change, no matter where the third aiming point M3 is disposed, the boss fight process of causing a fighting character BC to fight against the boss character MC can be started by causing the player character PC to throw the fighting character BC.

If in step S191, the processor 81 determines that a fight process is being currently executed, the processor 81 executes the boss fight process (step S198), and proceeds to step S200. For example, in the boss fight process, the processor 81 sets the player character PC's action of throwing a ball item Bs containing a fighting character BC chosen as a projectile, at a location in the virtual space indicated by the third aiming point M3, sets a movement of the thrown ball item Bs in the virtual space, and sets a series of scenes that the fighting character BC appears from a location in the virtual space that the ball item Bs has reached. After displaying the series of scenes, the processor 81 executes a process of causing the appearing fighting character BC to fight against the boss character MC.

In the boss fight process, the processor 81 changes the states of the fighting character BC and the boss character MC, depending on the fight against the fighting character BC, and causes a character whose state has been reduced to a predetermined threshold to lose the fight. In the boss fight process, the processor 81 sets the actions of the fighting character BC and/or the player character PC according to an operation input of choosing a command to control the actions of the fighting character BC and/or the player character PC. For example, if the operation data Da indicates an operation input chosen from a plurality of attack commands, the processor 81 controls the fighting character BC such that the fighting character BC performs an attack action corresponding to the attack command.

In the boss fight process of step S198, the processor 81, when ending the boss fight process, also ends the second character use process in which the subroutine is used. The processor 81 ends the boss fight process, for example, if a condition for ending the boss fight process is satisfied (e.g., the boss character MC has won/lost a fight against a fighting character BC), the user has performed an operation of ending the boss fight process, or the like. It should be noted that when a fighting character BC wins the boss character MC in a fight between the boss character MC and the fighting character BC, the processor 81 adjusts a condition for clearing the boss fight event such that the condition is more easily satisfied, for example, by setting a limitation on the movement of the boss character MC in the virtual space for at least a predetermined period of time immediately after the fighting character BC wins a fight against the boss character MC, as a non-limiting example.

In step S200, the processor 81 determines whether or not to end the boss fight event. The boss fight event is ended, for example, if a condition for ending the boss fight event is satisfied (e.g., the boss character MC has won/lost a fight against the player character PC in the fight, or the event period has expired), the user has performed an operation of ending the boss fight event, or the like. If the processor 81 determines to end the boss fight event, the processor 81 proceeds to step S201. Otherwise, if the processor 81 does not determine to end the boss fight event, the processor 81 ends the subroutine.

In step S201, the processor 81 executes a boss fight event end process, and ends the subroutine. For example, the processor 81 executes the boss fight event end process by ending the second character use process, and setting a scene that the boss character MC has won/lost a fight against the player character PC, or the like.

Referring back to FIG. 22, if in step S131, the processor 81 determines that a fighting character is not to be used in the current situation, the processor 81 executes other processes based on the operation data Da (step S133), and proceeds to step S134. As a non-limiting example of the other processes, the processor 81 changes the place and position of the player character PC in the virtual space according to an operation input of moving the player character PC that is indicated by the operation data Da, and updates the player character data Db. It should be noted that if the condition for ending the boss fight event is satisfied in step S128, the processor 81 executes the boss fight event end process.

In step S134, the processor 81 executes a character action process, and proceeds to the next step. For example, the processor 81 sets, based on the results of the processes of steps S122 to S133, the actions in the virtual space of the player character PC, the fighting character BC, the field character FC, the boss character MC, and the like, and the remaining amount of each gauge. As a non-limiting example, the processor 81 sets the place, position, action, state, and the like of each character and the remaining amount of each gauge, based on the settings and the progress of the set scene in steps S122 to S133, an algorithm for automatically controlling the action of each character, a virtual physical calculation in the virtual space, an operation input indicated by the operation data Da, and the like, and updates the player character data Db, the field character data Dc, the boss character data Dd, and the fighting character data De. As another non-limiting example, when an in-game event such as the boss fight event or an in-game mission is started based on the progression of a game or an operation input indicated by the operation data Da, the processor 81 causes an associated character to appear in the virtual space during the start of the event or the like, sets the place, position, movement, state, and the like of the character, and the remaining amount of each gauge, and updates data of each character.

Next, the processor 81 executes a display control process (step S135), and proceeds to the next step. For example, the processor 81 disposes each character, object, gauge, item, and the like in the virtual space based on the results of the processes of steps S122 to S134, data related to each character, object, and item, and the like. The processor 81 also sets the location and orientation of the virtual camera based on the operation data Da and the place and position of the player character PC, and generates and displays an image of the virtual space as viewed from the virtual camera on the display 12. The processor 81 also displays, on the display 12, an aiming point and/or catch information, which overlay the image of the virtual space, based on the aiming point data Dj and the catch information data Dk. It should be noted that the aiming point and/or catch information may be disposed in the virtual space, and may be displayed as a portion of the image of the virtual space as viewed from the virtual camera.

In the pictorial representation scene, the processor 81 displays, on the display 12, the pictorial representation image set in step S146.

Next, the processor 81 determines whether or not to end the game process (step S136). The game process in step S136 is ended, for example, if a condition for ending the game process is satisfied, the user has performed an operation of ending the game process, or the like. If the processor 81 does not determine to end the game process, the processor 81 returns to and repeats step S122. If the processor 81 determines to end the game process, the processor 81 ends the process of the flowchart. Thereafter, steps S122 to S136 are repeatedly executed until the processor 81 determines to end the game process in step S136.

Thus, in the present non-limiting example, the player character PC can be caused to perform different actions in different modes, i.e., switch between the first and second modes. In the first mode, the player character PC is caused to perform an action of launching an item for affecting a field character FC or the boss character MC as a target on the field, at the field character FC or the boss character MC, according to an operation input for causing the player character PC to perform a launching action in the direction indicated by an aiming point M. In the second mode, the player character PC is caused to perform an action of launching a fighting character BC that is to fight against a field character FC or the boss character MC on a field, at the field character FC or the boss character MC, according to an operation input for causing the player character PC to perform a launching action in the direction indicated by an aiming point M.

Although in the above non-limiting example, non-limiting examples of an operation input for executing each process has been described, the operation input is not limited to the above non-limiting example. In the present non-limiting example, in addition to operations using the operation buttons or sticks, a touch operation of using the touch panel 13, an operation of using the motion or orientation of the main body apparatus 2, an operation of using the motion or orientation of the body of the left controller 3 or the right controller 4, a pointing operation of using the body of the left controller 3 or the right controller 4, and the like, may be used as the operation input.

Although in the above non-limiting example, a player character launches an item or character in the direction indicated by an aiming point in the virtual space by performing a throwing action, a player character launches an item or character by performing other actions. For example, a player character may launch an item or character in the virtual space in the direction indicated by at an aiming point by performing a kicking action, a pushing action, a blowing action, a shooting action (firing, projecting, radiating, irradiating, etc.), a punching action, or the like.

In the above non-limiting example, the effect of a certain type of item is obtained when the item hits a target such as a field character FC, the boss character MC, or a collection object OBJ. The effect of such an item may be obtained when the item reaches a range formed in the vicinity of the target irrespective of whether the item hits the target. Conversely, in the above non-limiting example, the effect of another type of item is obtained when the item reaches a range formed in the vicinity of a target. The effect of such an item may be obtained when the item hits the target. Concerning the process of locking an aiming point on to one of field characters FC according to an operation input, an aiming point may be locked on to the boss character MC in the boss fight event according to the same operation input.

In the above non-limiting example, a gauge G (the gauges G1 to G3) is used to indicate a state of a field character FC or the boss character MC. The gauges G may indicate any parameter that causes progression of an in-game mission or an in-game event. For example, a parameter that causes progression of an in-game mission or an in-game event may indicate the emotions, endurance, remaining physical strength, action state, life value, or the like of a character.

In the above non-limiting example, it is assumed that an in-game event or an in-game mission is seamless throughout a game, and is played on a field in the same virtual space. However, in the present non-limiting example, even in the case where a game is played on a field in the same virtual space, different scenes may be provided in different events or missions.

The game system 1 may be any suitable apparatus, including a handheld game apparatus, or any suitable handheld electronic apparatus (a personal digital assistant (PDA), mobile telephone, personal computer, camera, tablet computer, etc.), etc. In that case, an input apparatus for performing an operation of causing a player character PC or a fighting character BC to perform an action may be, instead of the left controller 3 or the right controller 4, another controller, mouse, touchpad, touch panel, trackball, keyboard, directional pad, slidepad, etc.

In the foregoing, the information processes (game processes) are performed in the game system 1. Alternatively, at least a portion of the process steps may be performed in another apparatus. For example, when the game system 1 can also communicate with another apparatus (e.g., a server, another information processing apparatus, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above non-limiting example, the information processes can be performed by the processor 81 of the game system 1 executing predetermined programs. Alternatively, all or a portion of the above processes may be performed by a dedicated circuit included in the game system 1.

Here, according to the above non-limiting variation, the present non-limiting example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and the present non-limiting example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present non-limiting example.

The above programs may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present non-limiting example and common technical knowledge. It should be understood throughout the present specification that expression of a singular form includes the concept of its plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present non-limiting example pertain. If there is any inconsistency or conflict, the present specification (including the definitions) shall prevail.

As described above, the present non-limiting example is applicable as a game program, game system, game apparatus, game processing method, and the like that are capable of causing a player character to perform various actions on a field in a virtual space.

What is claimed is:

1. A non-transitory computer-readable storage medium having stored therein a game program that when executed by a computer of an information processing apparatus, causes the computer to perform operations comprising:
    generating data for display of a player character and a field character disposed on a field in a virtual space;
    receiving a first operation input and switching between at least a first and a second mode, based on the first operation input;
    receiving a second operation input and determining an aiming direction in the virtual space, based on the second operation input; and
    in the first mode,
        generating data for display of a first aiming point associated with the aiming direction,
        receiving a third operation input and selecting an item, from a plurality of items, based on the third operation input, and
        receiving a fourth operation input and generating data for display of the player character launching, in the aiming direction, the item that affects the field character disposed on the field in the virtual space, based on the fourth operation input, and when the item is launched at a place where the field character is disposed, generating an effect, associated with the item, for the field character, and
    in the second mode,
        generating data for display of a second aiming point associated with the aiming direction,
        receiving a fifth operation input and selecting a fighting character, from a plurality of fighting characters, based on the fifth operation input, and
        receiving a sixth operation input and generating data for display of the player character to launching, in the aiming direction, the fighting character that fights, based on the sixth operation input, and when the fighting character is launched at a place where the field character is disposed, generating data for display of the field character and the fighting character starting fighting against each other on the field in the virtual space.

2. The non-transitory computer-readable storage medium according to claim 1, wherein
    the item includes at least a catching item for catching the field character, and
    the game program further causes the computer to perform operations comprising:
        when the catching item launched in the first mode hits the field character, performing successful-catch determination relating to whether or not the catching is successful; and
        when the result of the successful-catch determination is positive, setting the field character hit by the catching item in a player's possession.

3. The non-transitory computer-readable storage medium according to claim 2, wherein
    the item further includes an item having the effect of causing the result of the successful-catch determination to be more likely positive.

4. The non-transitory computer-readable storage medium according to claim 2, wherein
    the item further includes an item having the effect of setting a limitation on a movement of the field character on the field.

5. The non-transitory computer-readable storage medium according to claim 2, wherein
    the game program further causes the computer to perform operations comprising:
        aligning the aiming direction with the field character, based on a seventh operation input.

6. The non-transitory computer-readable storage medium according to claim 5, wherein
    the game program further causes the computer to perform operations comprising:
        displaying an indicator indicating how likely the result of the successful-catch determination is to be positive for a field character with which the aiming direction is aligned.

7. The non-transitory computer-readable storage medium according to claim 5, wherein
    the game program further causes the computer to perform operations comprising:
        displaying information about a field character with which the aiming direction is aligned, based on the seventh operation input and an eighth operation input.

8. The non-transitory computer-readable storage medium according to claim 7, wherein
    the information about the field character includes mission information about a history of an in-game mission including at least the number of the caught field characters and the number of times of a fight against the field character.

9. The non-transitory computer-readable storage medium according to claim 2, wherein
the game program further causes the computer to perform operations comprising:
causing the fighting character and the field character to fight against each other on the field, based on an operation input including at least an instruction to attack by the fighting character and an instruction to use an item, after start of the fight;
when an instruction to use the catching item is issued during the fight, performing successful-catch determination of whether or not the field character is successfully caught using the catching item, based on a state of the field character that is changed due to the fight; and
when the result of the successful-catch determination is positive during the fight, setting the field character in a player's possession.

10. The non-transitory computer-readable storage medium according to claim 1, wherein
the game program further causes the computer to perform operations comprising:
during the fight,
displaying an indicator indicating a state of the field character related to at least physical strength, at a location that is set, corresponding to a location of the field character, and
controlling an orientation of a virtual camera, based on a seventh operation input.

11. The non-transitory computer-readable storage medium according to claim 1, wherein
the game program further causes the computer to perform operations comprising:
in the second mode, when the fighting character is launched at a place where a collection object indicating that an item is allowed to be obtained is disposed on the field, causing the fighting character to perform an action with respect to the collection object, and setting the item associated with the collection object in a player's possession.

12. The non-transitory computer-readable storage medium according to claim 1, wherein
the game program further causes the computer to perform operations comprising:
displaying a mark indicating the aiming direction in a display form that differs between the first mode and the second mode.

13. The non-transitory computer-readable storage medium according to claim 1, wherein
the item is an event item that causes progression of an in-game event by hitting the field character, and
the game program further causes the computer to perform operations comprising:
during the in-game event,
when a plurality of the event items have hit the field character until a clear condition is satisfied, determining that the in-game event is cleared, and
when the fight against the field character is won, causing the clear condition to be easier to satisfy.

14. The non-transitory computer-readable storage medium according to claim 13, wherein
the game program further causes the computer to perform operations comprising:
when the fight against the field character is won, setting a limitation on a movement of the field character in the virtual space during at least a period of time.

15. The non-transitory computer-readable storage medium according to claim 13, wherein
the clear condition is that an event parameter that is reduced each time the event item hits the field character is lower than or equal to a reference, and
the game program further causes the computer to perform operations comprising:
when the fight against the field character is won, relatively increasing a reduction amount of the event parameter corresponding to hitting by the event item during at least a period of time.

16. A game systems comprising:
a processor; and
a memory configured to store computer readable instructions that, when executed by the processor, cause the game system to:
generate data for display of a player character and a field character disposed on a field hi a virtual space;
receive a first operation input and switch between at least a first and a second mode, based on the first operation input;
receive a second operation input and determining an aiming direction in the virtual space, based on the second operation input; and
in the first mode,
generate data for display of the first aiming point associated with the aiming direction,
receive a third operation input and select an item, from a plurality of items, based on the third operation input, and
receive a fourth operation input and generate data for display of the player character launching, in the aiming direction, the item that affects the field character disposed on the field in the virtual space, based on the fourth operation input, and when the item is launched at a place where the field character is disposed, generate an effect, associated with the item, for the field character, and
in the second mode,
generate data for display of a second aiming point associated with the aiming direction,
receive a fifth operation input and select a fighting character, from a plurality of fighting characters, based on the fifth operation input, and
receive a sixth operation input and generate data for display of the player character launching, in the aiming direction, the fighting character that fights, based on the sixth operation input, and when the fighting character is launched at a place where the field character is disposed, generate data for display of the field character and the fighting character starting fighting against each other on the field in the virtual space.

17. The game system according to claim 16, wherein
the item includes at least a catching item for catching the field character, and
the game system is further caused to:
when the catching item launched in the first mode hits the field character, perform successful-catch determination relating to whether or not the catching is successful; and
when the result of the successful-catch determination is positive, set the field character hit by the catching item in a player's possession.

18. The game system according to claim 17, wherein
the item further includes an item having the effect of causing the result of the successful-catch determination to be more likely positive.

19. The game system according to claim 17, wherein
the item further includes an item having the effect of setting a limitation on a movement of the field character on the field.

20. The game system according to claim 17, wherein
the game system is further caused to:
    align the aiming direction with the field character, based on a seventh operation input.

21. The game system according to claim 20, wherein
the came system is further caused to:
    display an indicator indicating how likely the result of the successful-catch determination is to be positive for a field character with which the aiming direction is aligned.

22. The game system according to claim 20, wherein
the game system is further caused to:
    display information about a field character with which the aiming direction is aligned, based on the seventh operation input and an eighth operation input.

23. The game system according to claim 22, wherein
the information about the field character includes mission information about a history of an in-game mission including at least the number of the caught field characters and the number of times of a fight against the field character.

24. The game system according to claim 17, wherein
the game system is further caused to:
    cause the fighting character and the field character to fight against each other on the field, based on an operation input including at least an instruction to attack by the fighting character and an instruction to use an item, after start of the fight;
    when an instruction to use the catching item is issued during the fight, perform successful-catch determination of whether or not the field character is successfully caught using the catching item, based on a state of the field character that is changed due to the fight; and
    when the result of the successful-catch determination is positive during the fight, set the field character in a player's possession.

25. The game system according to claim 16, wherein
the game system is further caused to:
    during the fight,
        display an indicator indicating a state of the field character related to at least physical strength, at a location that is set, corresponding to a location of the field character, and
        control an orientation of a virtual camera, based on seventh operation input.

26. The game system according to claim 16, wherein
the game system is further caused to:
    in the second mode, when the fighting character is launched at a place where a collection object indicating that an item is allowed to be obtained is disposed on the field, cause the fighting character to perform an action with respect to the collection object, and set the item associated with the collection object in a player's possession.

27. The game system according to claim 16, wherein
the game system if further caused to:
    display a mark indicating the aiming direction in a display form that differs between the first mode and the second mode.

28. The game system according to claim 16, wherein
the item is an event item that causes progression of an in-game event by hitting the field character, and
the game system if further caused to:
    during the in-game event,
        when a plurality of the event items have hit the field character until a clear condition is satisfied, determine that the in-game event is cleared, and
        when the fight against the field character is won, cause the clear condition to be easier to satisfy.

29. The game system according to claim 28, wherein
the game system if further caused to:
    when the fight against the field character is won, set a limitation on a movement of the field character in the virtual space during at least a period of time.

30. The game system according to claim 28, wherein
the clear condition is that an event parameter that is reduced each time the event item hits the field character is lower than or equal to a reference, and
the game system if further caused to:
    when the fight against the field character is won, relatively increase a reduction amount of the event parameter corresponding to hitting by the event item during at least a period of time.

31. A game apparatus, comprising:
processing circuitry including at least one processor; and
a display operatively coupled to the processing circuitry,
    wherein the processing circuitry is configured to:
        generate data for display, on the display, of a player character and a field character disposed on a field in a virtual space;
        receive a first operation input and switch between at least a first and a second mode, based on the first operation input;
        receive a second operation input and determine an aiming direction in the virtual space, based on the second operation input; and
    in the first mode,
        generate data for display, on the display, of a first aiming point associated with the aiming direction,
        receive a third operation input and select an item, from a plurality of items, based on the third operation input, and
        receive a fourth operation input and generate data for display, on the display, of the player character launching, in the aiming direction, the item that affects to the field character disposed on the field in the virtual space, based on the fourth operation input, and when the item is launched at a place where the field character is disposed, generate an effect, associated with the item, for the field character, and
    in the second mode,
        generate data for display, on the display, of a second aiming point associated with the aiming direction,
        receive a fifth operation input and select a fighting character, from a plurality of fighting characters, based on the fifth operation input, and
        receive a sixth operation input and generate data for display, on the display, of the player character launching, in the aiming direction, the fighting character that fights, based on the sixth operation input, and when the fighting character is launched at a place where the field character is disposed, generate data for display, on the display, of the field character and the fighting character starting fighting against each other on the field in the virtual space.

32. The game apparatus according to claim 31, wherein the item includes at least a catching item for catching the field character, and
the processing circuitry is further configured to:
when the catching item launched in the first mode hits the field character, perform successful-catch determination relating to whether or not the catching is successful; and
when the result of the successful-catch determination is positive, set the field character hit by the catching item in a player's possession.

33. The game apparatus according to claim 32, wherein the processing circuitry is further configured to:
cause the fighting character and the field character to fight against each other on the field, based on an operation input including at least an instruction to attack by the fighting character and an instruction to use an item, after start of the fight;
when an instruction to use the catching item is issued during the fight, perform successful-catch determination of whether or not the field character is successfully caught using the catching item, based on a state of the field character that is changed due to the fight; and
when the result of the successful-catch determination is positive during the fight, set the field character in a player's possession.

34. The game apparatus according to claim 31, wherein the item is an event item that causes progression of an in-game event by hitting the field character, and
the processing circuitry is further configured to:
during the in-game event,
when a plurality of the event items have hit the field character until a clear condition is satisfied, determine that the in-game event is cleared, and
when the fight against the field character is won, cause the clear condition to be easier to satisfy.

35. A game processing method, comprising:
generating data for display of a player character and a field character disposed on a field in a virtual space;
receiving a first operation input and switching between at least a first and a second mode, based on the first operation input;
receiving a second operation input and determining an aiming direction in the virtual space, based on the second operation input; and
in the first mode,
generating data for display of a first aiming point associated with the aiming direction,
receiving a third operation input and selecting an item, from a plurality of items, based on the third operation input, and
receiving a fourth operation input and generating data for display of the player character launching, in the aiming direction, the item that affects the field character disposed on the field in the virtual space, based on the fourth operation input, and when the item is launched at a place where the field character is disposed, generating an effect, associated with the item, for the field character, and
in the second mode,
generating data for display of a second aiming point associated with the aiming direction,
receiving a fifth operation input and selectin a fighting character, from a plurality of fighting characters, based on the fifth operation input, and
receiving a sixth operation input and generating data for display of the player character launching, in the aiming direction, the fighting character that fights, based on the sixth operation input, and when the fighting character is launched at a place where the field character is disposed, generating data for display of the field character and the fighting character starting fighting against each other on the field in the virtual space.

36. The game processing method according to claim 35, wherein
the item includes at least a catching item for catching the field character, and
the game processing method further comprising:
when the catching item launched in the first mode hits the field character, performing successful-catch determination relating to whether or not the catching is successful; and
when the result of the successful-catch determination is positive, setting the field character hit by the catching item in a player's possession.

37. The game apparatus according to claim 36, further comprising:
causing the fighting character and the field character to fight against each other on the field, based on an operation input including at least an instruction to attack by the fighting character and an instruction to use an item, after start of the fight;
when an instruction to use the catching item is issued during the fight, performing successful-catch determination of whether or not the field character is successfully caught using the catching item, based on a state of the field character that is changed due to the fight; and
when the result of the successful-catch determination is positive during the fight, setting the field character in a player's possession.

38. The game processing method according to claim 35, wherein
the item is an event item that causes progression of an in-game event by hitting the field character, and
the game processing method further comprises:
during the in-game event,
when a plurality of the event items have hit the field character until a clear condition is satisfied, determining that the in-game event is cleared, and
when the fight against the field character is won, causing the clear condition to be easier to satisfy.

* * * * *